United States Patent
Bondesen et al.

(10) Patent No.: US 9,830,597 B2
(45) Date of Patent: Nov. 28, 2017

(54) FORMATION AND FUNDING OF A SHARED TOKEN

(71) Applicant: BANK OF AMERICA CORPORATION, Charlotte, NC (US)

(72) Inventors: Laura Corinne Bondesen, Charlotte, NC (US); Jason P. Blackhurst, Charlotte, NC (US); Scott Lee Harkey, Concord, NC (US); William Blakely Belchee, Charlotte, NC (US); Tammy L. Brunswig, Fort Mill, SC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 629 days.

(21) Appl. No.: 14/196,802

(22) Filed: Mar. 4, 2014

(65) Prior Publication Data
US 2015/0254653 A1    Sep. 10, 2015

(51) Int. Cl.
*G06Q 40/00*    (2012.01)
*G06Q 20/38*    (2012.01)

(52) U.S. Cl.
CPC .................. *G06Q 20/385* (2013.01)

(58) Field of Classification Search
USPC ..... 705/30, 40, 39, 41, 45, 26.8, 10, 14, 44, 705/37, 38, 67; 709/225, 227, 231, 234; 235/492
See application file for complete search history.

(56) References Cited

U.S. PATENT DOCUMENTS

| | | |
|---|---|---|
| 4,766,293 A | 8/1988 | Boston |
| 5,438,186 A | 8/1995 | Nair et al. |
| 6,119,103 A | 9/2000 | Basch et al. |
| 6,254,000 B1 | 7/2001 | Degen et al. |
| 6,256,670 B1 | 7/2001 | Davies |
| 6,330,546 B1 | 12/2001 | Gopinathan et al. |

(Continued)

FOREIGN PATENT DOCUMENTS

| | | |
|---|---|---|
| EP | 1132876 A2 | 9/2001 |
| WO | 2012058099 A1 | 5/2012 |
| WO | 2013095486 A1 | 6/2013 |

OTHER PUBLICATIONS

Lane, "History of APIs"; APIEvangelist.com; Dec. 2012, 11 pages.

(Continued)

*Primary Examiner* — Tien Nguyen
(74) *Attorney, Agent, or Firm* — Michael A. Springs; Moore & Van Allen PLLC; Jeffrey R. Gray

(57) ABSTRACT

Embodiments of the present invention disclose utilizing a token associated with a payment device. Particularly, embodiments of the present invention may create a single token for use by a plurality of users on one or more of the payment devices of each user. The token may be made available for use by various users that can be added and removed as the group of users associated with the token changes. The token may be associated with various types of accounts, such as but not limited to a business account from a business client, a retail account from a retail client, or other like clients. In some embodiments the token may be associated with a specific account that already has funds in the account, or the token may be associated with a specific account that is unfunded or a new account that the users associated with the token may fund.

20 Claims, 5 Drawing Sheets

(56) References Cited

U.S. PATENT DOCUMENTS

| | | |
|---|---|---|
| 6,516,056 B1 | 2/2003 | Justice et al. |
| 6,658,393 B1 | 12/2003 | Basch et al. |
| 6,718,328 B1 | 4/2004 | Norris |
| 7,111,323 B1 | 9/2006 | Bhatia et al. |
| 7,136,835 B1 | 11/2006 | Flitcroft et al. |
| 7,177,838 B1 | 2/2007 | Ling |
| 7,328,189 B2 | 2/2008 | Ling |
| 7,337,144 B1 | 2/2008 | Blinn et al. |
| 7,398,250 B2 | 7/2008 | Blinn et al. |
| 7,555,460 B1* | 6/2009 | Barkan ............... G06Q 20/06 235/492 |
| 7,596,530 B1 | 9/2009 | Glasberg |
| 7,606,560 B2 | 10/2009 | Labrou et al. |
| 7,610,040 B2 | 10/2009 | Cantini et al. |
| 7,627,505 B2 | 12/2009 | Yoshida et al. |
| 7,657,489 B2 | 2/2010 | Stambaugh |
| 7,693,771 B1 | 4/2010 | Zimmerman et al. |
| 7,698,221 B2 | 4/2010 | Blinn et al. |
| 7,698,443 B2 | 4/2010 | Yaffe et al. |
| 7,729,985 B1* | 6/2010 | Rolf ...................... G06Q 20/10 705/39 |
| 7,739,169 B2 | 6/2010 | Hammad |
| 7,742,967 B1 | 6/2010 | Keresman, III et al. |
| 7,783,281 B1 | 8/2010 | Cook et al. |
| 7,784,684 B2 | 8/2010 | Labrou et al. |
| 7,848,980 B2 | 12/2010 | Carlson |
| 7,933,810 B2* | 4/2011 | Morgenstern ......... G06Q 30/02 705/26.1 |
| 7,946,480 B2 | 5/2011 | Miller et al. |
| 7,992,779 B2 | 8/2011 | Phillips et al. |
| 8,012,219 B2 | 9/2011 | Mendez et al. |
| 8,032,932 B2 | 10/2011 | Speyer et al. |
| 8,171,531 B2 | 5/2012 | Buer |
| 8,245,915 B1 | 8/2012 | Ramachandran et al. |
| 8,249,805 B2 | 8/2012 | de Silva et al. |
| 8,307,413 B2 | 11/2012 | Smadja et al. |
| 8,327,428 B2 | 12/2012 | Bailey et al. |
| 8,327,429 B2 | 12/2012 | Speyer et al. |
| 8,346,666 B2 | 1/2013 | Lindelsee et al. |
| 8,380,177 B2 | 2/2013 | Laracey |
| 8,395,242 B2 | 3/2013 | Oliver et al. |
| 8,407,142 B1 | 3/2013 | Griggs |
| 8,423,466 B2 | 4/2013 | Lanc |
| 8,498,940 B2 | 7/2013 | Pelegero et al. |
| 8,522,039 B2 | 8/2013 | Hyndman et al. |
| 8,572,689 B2 | 10/2013 | Radhakrishnan |
| 8,577,804 B1 | 11/2013 | Bacastow |
| 8,583,498 B2 | 11/2013 | Fried et al. |
| 8,584,251 B2 | 11/2013 | McGuire et al. |
| 8,589,271 B2 | 11/2013 | Evans |
| 8,590,008 B1 | 11/2013 | Ellmore |
| 8,595,812 B2 | 11/2013 | Bomar et al. |
| 8,620,790 B2 | 12/2013 | Priebatsch |
| 8,682,802 B1* | 3/2014 | Kannanari ......... G06Q 20/3274 705/64 |
| 8,683,571 B2 | 3/2014 | Zapata et al. |
| 8,768,838 B1 | 7/2014 | Hoffman |
| 8,788,333 B2 | 7/2014 | Alba et al. |
| 8,788,429 B2 | 7/2014 | Tieken |
| 8,789,162 B2 | 7/2014 | Radhakrishnan |
| 8,839,383 B2 | 9/2014 | Van Horn |
| 8,930,271 B1 | 1/2015 | Ellis et al. |
| 8,943,574 B2 | 1/2015 | Bailey et al. |
| 8,973,102 B2 | 3/2015 | Jakobsson |
| 8,985,442 B1 | 3/2015 | Zhou et al. |
| 8,996,423 B2 | 3/2015 | Johnson et al. |
| 9,002,750 B1 | 4/2015 | Chu |
| 9,055,053 B2 | 6/2015 | Radhakrishnan et al. |
| 9,069,943 B2 | 6/2015 | Radhakrishnan et al. |
| 9,195,984 B1 | 11/2015 | Spector et al. |
| 9,412,106 B2 | 8/2016 | Laracey |
| 2002/0111907 A1 | 8/2002 | Ling |
| 2002/0186845 A1 | 12/2002 | Dutta et al. |
| 2003/0004866 A1 | 1/2003 | Huennekens et al. |
| 2003/0045328 A1 | 3/2003 | Natsuno |
| 2003/0061170 A1 | 3/2003 | Uzo |
| 2003/0105714 A1 | 6/2003 | Alarcon-Luther et al. |
| 2003/0163787 A1 | 8/2003 | Hay et al. |
| 2005/0222961 A1 | 10/2005 | Staib et al. |
| 2006/0036868 A1 | 2/2006 | Cicchitto |
| 2006/0089893 A1 | 4/2006 | Joseph et al. |
| 2006/0155603 A1* | 7/2006 | Abendroth ............. G06Q 30/02 705/14.15 |
| 2006/0206709 A1 | 9/2006 | Labrou et al. |
| 2006/0287004 A1 | 12/2006 | Fuqua |
| 2007/0055594 A1 | 3/2007 | Rivest et al. |
| 2007/0100773 A1 | 5/2007 | Wallach |
| 2007/0194884 A1 | 8/2007 | Didier et al. |
| 2007/0203835 A1 | 8/2007 | Cai |
| 2007/0208627 A1* | 9/2007 | Abadi ................... G06Q 30/06 705/26.8 |
| 2007/0219984 A1 | 9/2007 | Aravamudan et al. |
| 2007/0223706 A1 | 9/2007 | Gantman et al. |
| 2007/0250920 A1 | 10/2007 | Lindsay |
| 2007/0276764 A1 | 11/2007 | Mann, III et al. |
| 2008/0052209 A1* | 2/2008 | Bowne ................. G06Q 20/102 705/35 |
| 2008/0109319 A1 | 5/2008 | Foss |
| 2008/0162338 A1 | 7/2008 | Samuels et al. |
| 2008/0162589 A1 | 7/2008 | Rodeheffer et al. |
| 2008/0167965 A1 | 7/2008 | Von Nothaus et al. |
| 2008/0189210 A1 | 8/2008 | Sawhney |
| 2008/0195499 A1 | 8/2008 | Meredith et al. |
| 2008/0275748 A1 | 11/2008 | John |
| 2008/0293397 A1 | 11/2008 | Gajdos et al. |
| 2008/0313087 A1 | 12/2008 | Joseph et al. |
| 2008/0319889 A1 | 12/2008 | Hammad |
| 2009/0006230 A1 | 1/2009 | Lyda et al. |
| 2009/0019534 A1 | 1/2009 | Bakshi et al. |
| 2009/0048953 A1 | 2/2009 | Hazel et al. |
| 2009/0057396 A1 | 3/2009 | Barbour et al. |
| 2009/0100529 A1 | 4/2009 | Livnat et al. |
| 2009/0119190 A1 | 5/2009 | Realini |
| 2009/0150286 A1 | 6/2009 | Barton |
| 2009/0164327 A1 | 6/2009 | Bishop et al. |
| 2009/0259524 A1* | 10/2009 | Rozenkrants ........ G06Q 10/101 705/35 |
| 2009/0328186 A1 | 12/2009 | Pollutro et al. |
| 2010/0011103 A1* | 1/2010 | Luzzatti ............ H04L 29/06027 709/226 |
| 2010/0036741 A1 | 2/2010 | Cleven |
| 2010/0042539 A1* | 2/2010 | Dheer ................... G06Q 20/10 705/40 |
| 2010/0051686 A1 | 3/2010 | Obi |
| 2010/0064345 A1 | 3/2010 | Bentley et al. |
| 2010/0070376 A1 | 3/2010 | Proud et al. |
| 2010/0122333 A1 | 5/2010 | Noe |
| 2010/0235882 A1* | 9/2010 | Moore ................... G06Q 20/06 726/3 |
| 2010/0241571 A1 | 9/2010 | McDonald |
| 2010/0268645 A1 | 10/2010 | Martino et al. |
| 2010/0312636 A1 | 12/2010 | Coulter et al. |
| 2011/0022483 A1 | 1/2011 | Hammad |
| 2011/0093371 A1* | 4/2011 | Clemm ................ G06Q 30/0207 705/34 |
| 2011/0099104 A1 | 4/2011 | Nybom |
| 2011/0103586 A1 | 5/2011 | Nobre |
| 2011/0137804 A1 | 6/2011 | Peterson |
| 2011/0143663 A1 | 6/2011 | Renard et al. |
| 2011/0166992 A1* | 7/2011 | Dessert ............... G06Q 20/0655 705/39 |
| 2011/0218907 A1 | 9/2011 | Dessert et al. |
| 2011/0251892 A1 | 10/2011 | Laracey |
| 2011/0270618 A1* | 11/2011 | Banerjee ............... G06Q 30/02 705/1.1 |
| 2011/0277016 A1 | 11/2011 | Hockings et al. |
| 2012/0018506 A1 | 1/2012 | Hammad et al. |
| 2012/0023022 A1 | 1/2012 | Carroll et al. |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0030109 A1 | 2/2012 | Dooley Maley et al. |

(56) References Cited

U.S. PATENT DOCUMENTS

| | | | |
|---|---|---|---|
| 2012/0079111 A1* | 3/2012 | Luukkala | H04W 76/005 709/225 |
| 2012/0158540 A1 | 6/2012 | Ganti et al. | |
| 2012/0158586 A1 | 6/2012 | Ganti et al. | |
| 2012/0160912 A1 | 6/2012 | Laracey | |
| 2012/0166334 A1 | 6/2012 | Kimberg et al. | |
| 2012/0166338 A1* | 6/2012 | Agnelli | G06Q 20/40 705/44 |
| 2012/0171237 A1 | 7/2012 | Ching et al. | |
| 2012/0179558 A1 | 7/2012 | Fischer | |
| 2012/0185355 A1* | 7/2012 | Kilroy | G06Q 30/0633 705/26.8 |
| 2012/0197743 A1 | 8/2012 | Grigg et al. | |
| 2012/0197794 A1* | 8/2012 | Grigg | G06Q 20/105 705/41 |
| 2012/0197797 A1 | 8/2012 | Grigg et al. | |
| 2012/0203700 A1 | 8/2012 | Ornce et al. | |
| 2012/0252365 A1 | 10/2012 | Lam | |
| 2012/0254941 A1 | 10/2012 | Levien et al. | |
| 2012/0265679 A1 | 10/2012 | Calman et al. | |
| 2012/0265688 A1 | 10/2012 | Dinan | |
| 2012/0271712 A1 | 10/2012 | Katzin et al. | |
| 2012/0290482 A1 | 11/2012 | Atef et al. | |
| 2012/0316992 A1 | 12/2012 | Obome | |
| 2012/0317034 A1 | 12/2012 | Guha et al. | |
| 2012/0323783 A1 | 12/2012 | Canetto | |
| 2012/0330846 A1 | 12/2012 | Light et al. | |
| 2013/0006779 A1* | 1/2013 | Belluomini | G06Q 30/02 705/14.69 |
| 2013/0013499 A1 | 1/2013 | Kalgi | |
| 2013/0018738 A1 | 1/2013 | Faires et al. | |
| 2013/0018791 A1 | 1/2013 | Mendicino et al. | |
| 2013/0024360 A1 | 1/2013 | Ballout | |
| 2013/0036000 A1 | 2/2013 | Giordano et al. | |
| 2013/0036048 A1 | 2/2013 | Campos et al. | |
| 2013/0054336 A1 | 2/2013 | Graylin | |
| 2013/0054470 A1 | 2/2013 | Campos et al. | |
| 2013/0085927 A1 | 4/2013 | Scott | |
| 2013/0110658 A1 | 5/2013 | Lyman et al. | |
| 2013/0124346 A1 | 5/2013 | Baldwin et al. | |
| 2013/0159178 A1 | 6/2013 | Colon et al. | |
| 2013/0166332 A1 | 6/2013 | Hammad | |
| 2013/0179341 A1 | 7/2013 | Boudreau | |
| 2013/0179954 A1 | 7/2013 | Bidare | |
| 2013/0191227 A1 | 7/2013 | Pasa et al. | |
| 2013/0204775 A1 | 8/2013 | Midkiff et al. | |
| 2013/0204787 A1 | 8/2013 | Dubois | |
| 2013/0212007 A1 | 8/2013 | Mattsson et al. | |
| 2013/0212019 A1 | 8/2013 | Mattsson et al. | |
| 2013/0226799 A1 | 8/2013 | Raj | |
| 2013/0246258 A1 | 9/2013 | Dessert | |
| 2013/0246260 A1 | 9/2013 | Baden et al. | |
| 2013/0254052 A1 | 9/2013 | Royyuru et al. | |
| 2013/0254115 A1 | 9/2013 | Pasa et al. | |
| 2013/0262315 A1 | 10/2013 | Hruska | |
| 2013/0268437 A1 | 10/2013 | Desai et al. | |
| 2013/0304637 A1 | 11/2013 | McCabe et al. | |
| 2013/0304651 A1 | 11/2013 | Smith | |
| 2013/0311365 A1 | 11/2013 | Miller et al. | |
| 2013/0346302 A1 | 12/2013 | Purves et al. | |
| 2014/0006273 A1 | 1/2014 | Gopinath et al. | |
| 2014/0012647 A1 | 1/2014 | Hecht | |
| 2014/0025581 A1 | 1/2014 | Calman | |
| 2014/0025958 A1 | 1/2014 | Calman | |
| 2014/0095383 A1 | 4/2014 | Rao | |
| 2014/0122331 A1 | 5/2014 | Vaish et al. | |
| 2014/0129357 A1 | 5/2014 | Goodwin | |
| 2014/0143089 A1 | 5/2014 | Campos et al. | |
| 2014/0143145 A1 | 5/2014 | Kortina et al. | |
| 2014/0156535 A1 | 6/2014 | Jabbour et al. | |
| 2014/0164243 A1 | 6/2014 | Aabye et al. | |
| 2014/0188719 A1 | 7/2014 | Poomachandran et al. | |
| 2014/0208401 A1 | 7/2014 | Balakrishnan et al. | |
| 2014/0214640 A1 | 7/2014 | Mallikaijunan et al. | |
| 2014/0244493 A1 | 8/2014 | Kenyon et al. | |
| 2014/0245391 A1 | 8/2014 | Adenuga | |
| 2014/0258085 A1* | 9/2014 | Bargagli | G06Q 40/025 705/38 |
| 2014/0258157 A1* | 9/2014 | Pridmore | G06Q 40/00 705/319 |
| 2014/0279476 A1 | 9/2014 | Hua | |
| 2014/0279554 A1 | 9/2014 | Priebatsch et al. | |
| 2014/0279566 A1 | 9/2014 | Verma et al. | |
| 2014/0279688 A1* | 9/2014 | Ginsberg | G06Q 40/06 705/36 R |
| 2014/0310764 A1 | 10/2014 | Tippett et al. | |
| 2014/0315159 A1 | 10/2014 | Mukherjee et al. | |
| 2014/0330721 A1 | 11/2014 | Wang | |
| 2014/0337175 A1 | 11/2014 | Katzin et al. | |
| 2014/0344153 A1 | 11/2014 | Raj et al. | |
| 2014/0351125 A1 | 11/2014 | Miller et al. | |
| 2015/0019317 A1 | 1/2015 | Mitchell | |
| 2015/0019439 A1 | 1/2015 | Phillips | |
| 2015/0032621 A1 | 1/2015 | Kar et al. | |
| 2015/0032625 A1 | 1/2015 | Dill et al. | |
| 2015/0032627 A1 | 1/2015 | Dill et al. | |
| 2015/0081557 A1 | 3/2015 | Kinfoil et al. | |
| 2015/0081567 A1 | 3/2015 | Boyle et al. | |
| 2015/0100495 A1 | 4/2015 | Salama et al. | |
| 2015/0106275 A1 | 4/2015 | Wolfs et al. | |
| 2015/0120569 A1 | 4/2015 | Belshe et al. | |
| 2015/0120572 A1 | 4/2015 | Slade | |
| 2015/0199679 A1 | 7/2015 | Palanisamy et al. | |
| 2015/0206137 A1 | 7/2015 | Mazarim Fernandes | |
| 2015/0220914 A1 | 8/2015 | Purves et al. | |
| 2015/0254650 A1 | 9/2015 | Bondesen et al. | |
| 2015/0254653 A1 | 9/2015 | Bondesen et al. | |

OTHER PUBLICATIONS

Simon, "Credit-Card Reward Programs: A Short History"; Creditcards.com, Nov. 2006, 4 pages.
Related U.S. Appl. No. 14/196,816, filed Mar. 4, 2014.
Related U.S. Appl. No. 14/196,798, filed Mar. 4, 2014.

* cited by examiner

FORMATION AND FUNDING OF A SHARED TOKEN

FIELD

This invention relates generally to the field of improving security for transactions, and more particularly embodiments of the invention relate to using tokens in place of account information in various ways in order to enter into transactions securely.

BACKGROUND

Entering into transactions using account information leaves an account holder open to potential account misappropriation because the customer's account information is shared between multiple parties (e.g., another user, a merchant, an acquiring financial institution, payment association networks, issuing financial institution, or the like) in order to complete the transaction.

BRIEF SUMMARY

Embodiments of the present invention address the above needs and/or achieve other advantages by providing apparatuses (e.g., a system, computer program product, and/or other device) and methods that help users enter into transaction securely.

Embodiments of the present invention disclose utilizing a token (e.g., a virtual payment instrument) associated with a payment device (e.g., a personal computer, a laptop, a mobile device, such as a phone, smartphone, tablet, or personal display device, fob, payment wand, or any other like device). The token may be associated in some embodiments directly with the payment device; however, in other embodiments the token may be associated with a digital wallet stored within the payment device. Particularly, embodiments of the present invention may create a single token for use by a plurality of users on one or more of the payment devices of each user. The token may be made available for use by various users that can be added and removed as the group of users associated with the token changes. The token may be associated with various types of accounts, such as but not limited to a business account from a business client (e.g., for a corporate client, non-profit organization, or the like), a retail account from a retail client (e.g., parents, trustee, legal guardian, a user setting up an account for a trip, or the like), or other like clients. Therefore, in some embodiments the token may be associated with a specific account that already has funds in the account. In other embodiments the token may be associated with a specific account that is unfunded, or a new account may be created, and the users associated with the token may associate funds with the account (e.g., fund the account). One or more of the plurality users associated with the token or account may associate funds with the account. For example, each user may contribute an equal amount of funds to the account, submit different funds to pay for particular products (e.g., goods or services), submit funds for shared transactions, or the like.

Limits may be placed on the token associated with the account, or on one or more of the plurality of users associated with the token (or account). As such, there may be global limits on the accounts, users, or tokens, as well as individual limits on each of the plurality of users. The limits, which are described in further detail below, may relate to the amount spent using the account, the transaction amount, geographic limits, merchant or product limits, time limits, or the like. The limits may be approval limits or denial limits. Moreover, the limits may include being able to lock, unlock, suspend, or take another like action on the use of the token. The limits may be placed by an employer to control purchases made by employees, by a family member to control purchases made by other family members or dependents, or by any other primary account holder (e.g., trustee) on users of the account (e.g., trust recipient). In addition, limits may be placed on the token (e.g., global limits) or on the individual users, or groups of users to control the transactions made by the users 4 (e.g., to prevent users from spending more than they contributed, were allocated to spend, or the like).

The business client or the retail client may be the account owner that determines, what users to associate with the token, the contribution amounts for funding the account, the limits to place on the token, or the like. In other embodiments an administrator (e.g., person in charge of the account) that is assigned to the account may determine the one or more users to associate with the token, the contribution amounts for funding the account, the limits to place on the token, or the like. Administrators may be employees or officers of a business (e.g., an accounting department) that are in charge of corporate accounts, and the users may be the employees of the company that have access to one or more accounts of the corporation. In another example, the administrators may be parents and the users may be the children, grandparents, or other dependents of the parents. In a further embodiment the administrators may be trustees and the users may be the beneficiaries of the trust controlled by the trustees. In still another embodiment, the administrators may be one of the users that has sent up an account for one or more transactions or groups of transactions (e.g., a trip, a product that a group of users are purchasing together, or the like), and the users may be people using the account for the transactions (e.g., going on the trip, responsible for a portion of the one or more transactions, or the like).

Each of the users that have access to the token may utilize the token instead of using the actual account information (e.g., account number or other account information) of the account with which the token is associated. As such, the users do not utilize the actual account number or other account information to enter into a transaction and instead utilize the tokens to enter into transactions. Moreover, if the token becomes compromised, instead of having to reissue a new account number, the client or administrator may only need to replace the token while the customer account information stays the same.

Embodiments of the invention comprise systems, computer program products and methods for utilizing a token based financial transaction system, whereby a shared token associated with a financial account is utilized by a collaborative group of users, comprising a plurality of users, to enter into transactions, whereby funds for the financial account are provided by the collaborative group of users. The invention comprises associating the shared token with the financial account, wherein the financial account provides a centralized location of the funds for the collaborative group of users to enter into the transactions using the shared token; associating the shared token with a payment device of each of a the plurality of users, wherein the shared token is stored on the payment device or an application on the payment device or token information for accessing the shared token is stored on the payment device or the application on the payment device; receiving a contribution amount from one or more of the plurality of users, wherein the one or more of the plurality of users fund the financial account associated with the shared token with one or more other user financial accounts; and setting one or more limits on the use of the shared token by the plurality of users, wherein the one or more limits are associated with the at least one of the shared token and/or the financial account associated with the shared token, and wherein the one or more limits define what financial transactions will be authorized when using the shared token.

In further accord with an embodiment, the invention comprises receiving an indication that the shared token is used in a transaction; receiving transaction information associated with the transaction, wherein the transaction information at least includes an identity of a user; identifying the limits on the use of the shared token by the user associated with the transaction; determining when the transaction information meets the limits; allowing the transaction when the limits are met; and denying the transaction when the limits fail to be met.

In another embodiment of the invention, the contribution amount from the one or more of the plurality of users is a recurring contribution to continuously fund the account.

In still another embodiment of the invention the shared token is limited to a time period, such that after the time period is over the shared token associated with the financial account is removed from the payment devices of the plurality of users.

In yet another embodiment of the invention, the one or more limits comprise at least a spending limit on a spending amount for each of the plurality of users based at least in part on the contribution amount contributed by each of the plurality of users.

In further accord with an embodiment, the invention comprises removing the shared token from the payment device associated with at least one of the plurality of users; and providing a refund amount to the at least one of the plurality of users based on the contribution amount contributed by the at least one of the plurality of users.

In another embodiment, the invention comprises adding the shared token to a payment device associated with a new user to add the new user to the plurality of users that may enter into transactions using the shared token; and receiving a new contribution amount from the new user to fund the account.

In yet another embodiment, the invention comprises assigning an administrator to set the one or more limits on the use of the shared token.

In still another embodiment of the invention, associating the shared token with a payment device of each of a plurality of users comprises associating the shared token with a digital wallet of each of the plurality of users.

In further accord with an embodiment of the invention, a financial institution stores the association between the shared token, the financial account, and the plurality of users.

In another embodiment of the invention, a third party institution stores the association between the shared token, the financial account, and the plurality of users.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
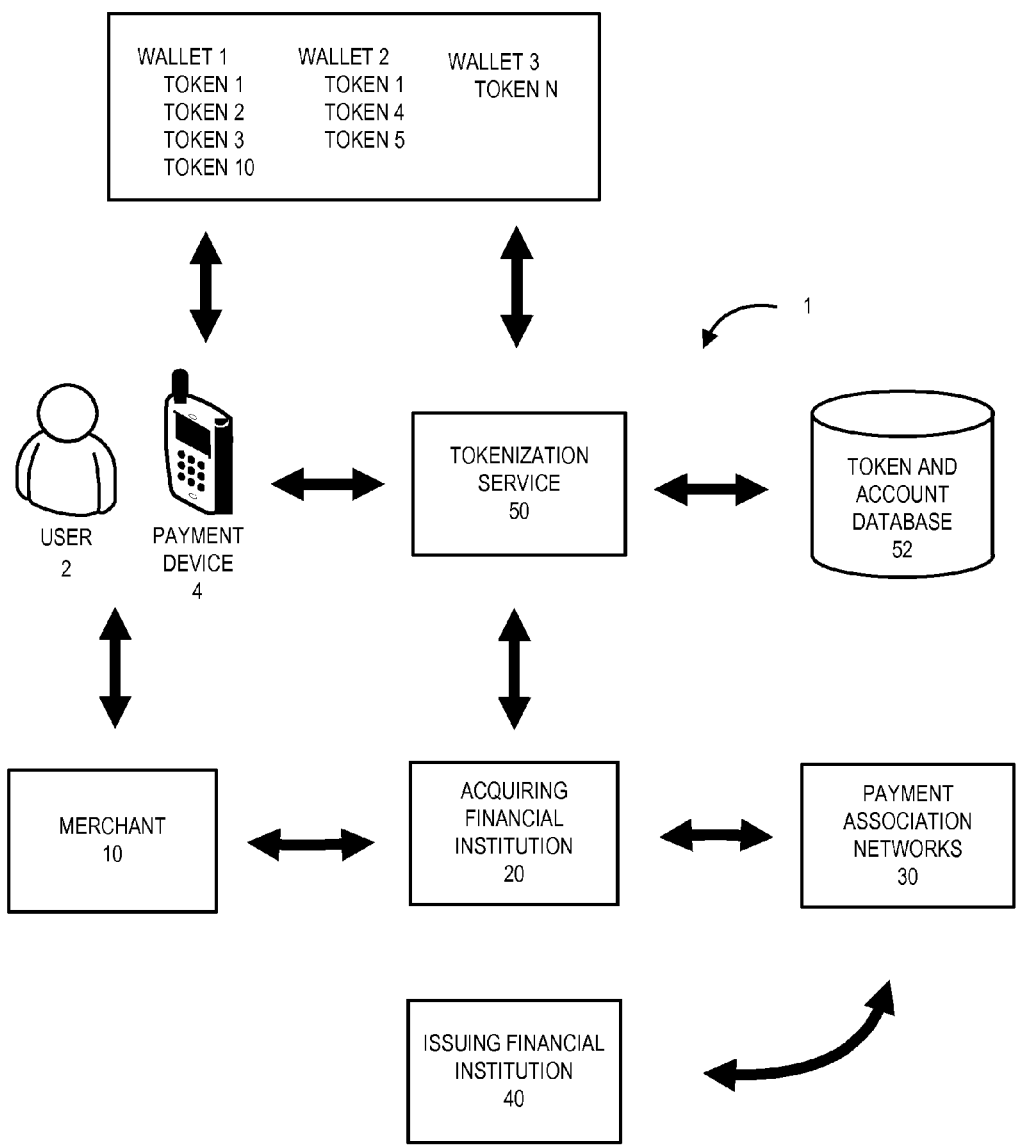
Figure 2:
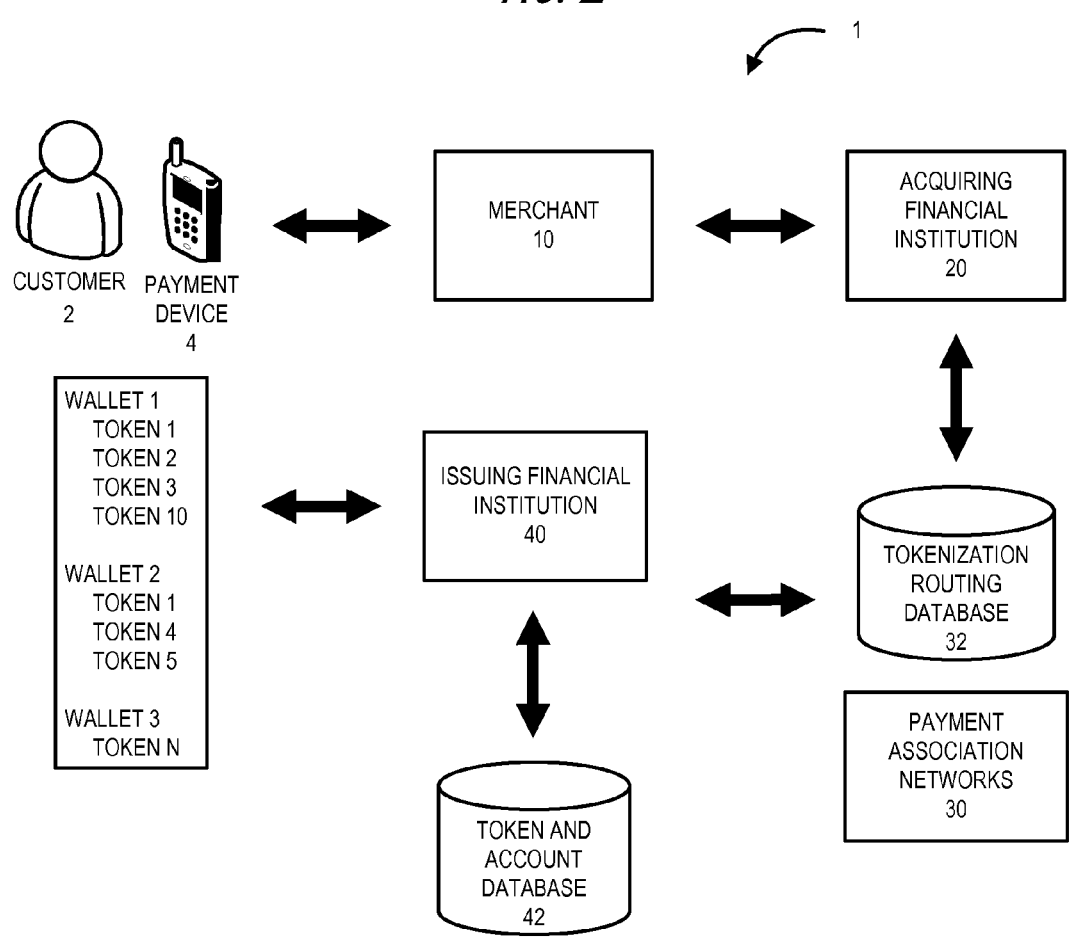
Figure 3:
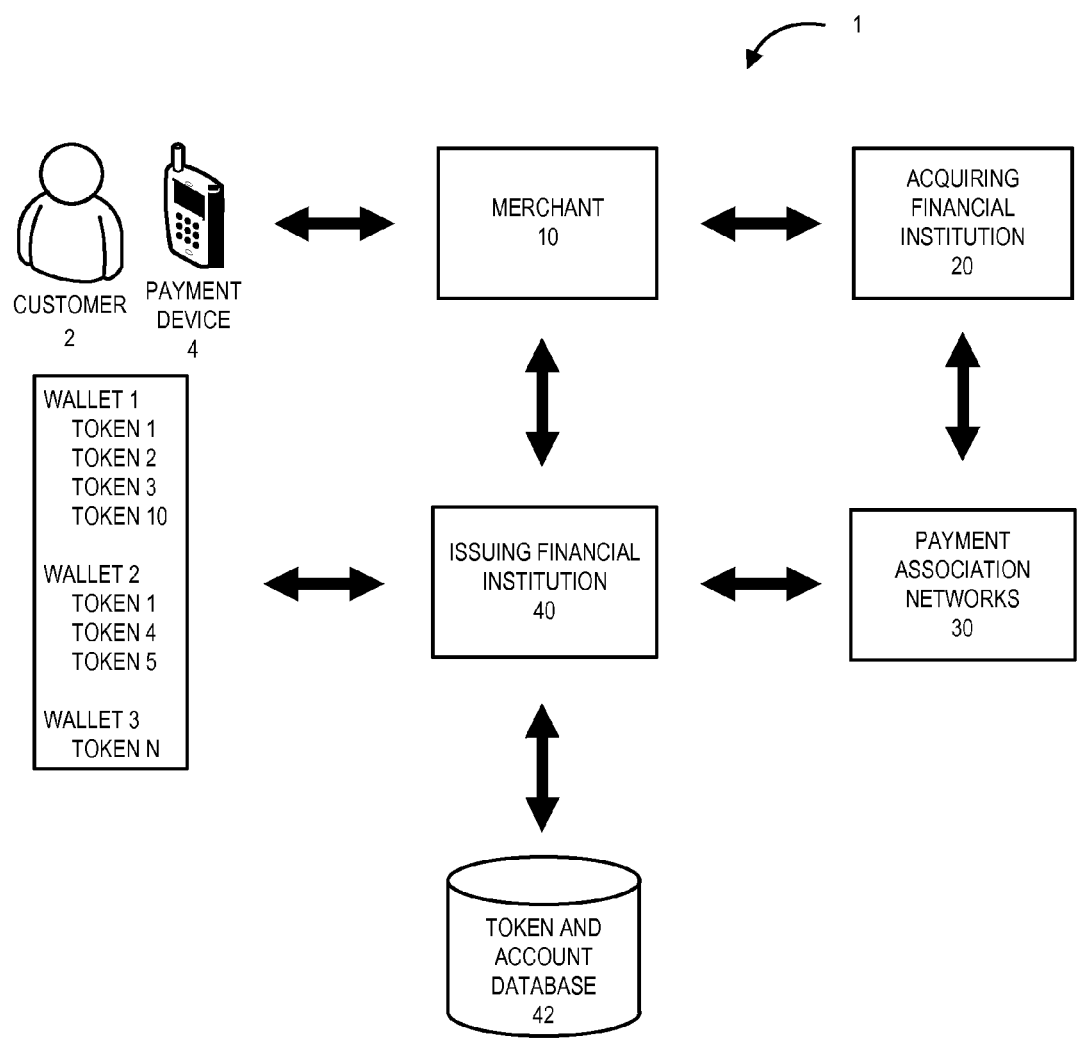
Figure 4:
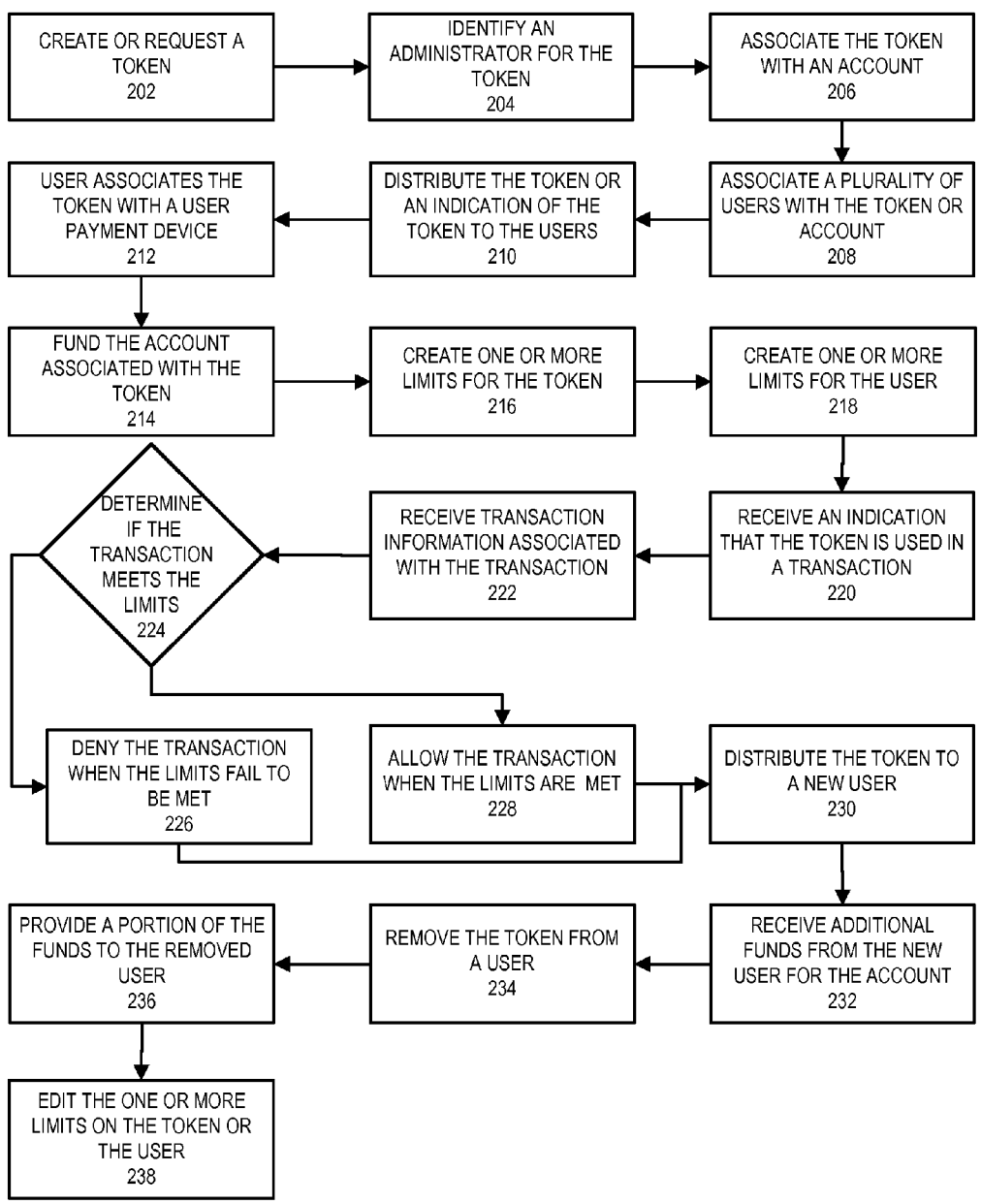
Figure 5:
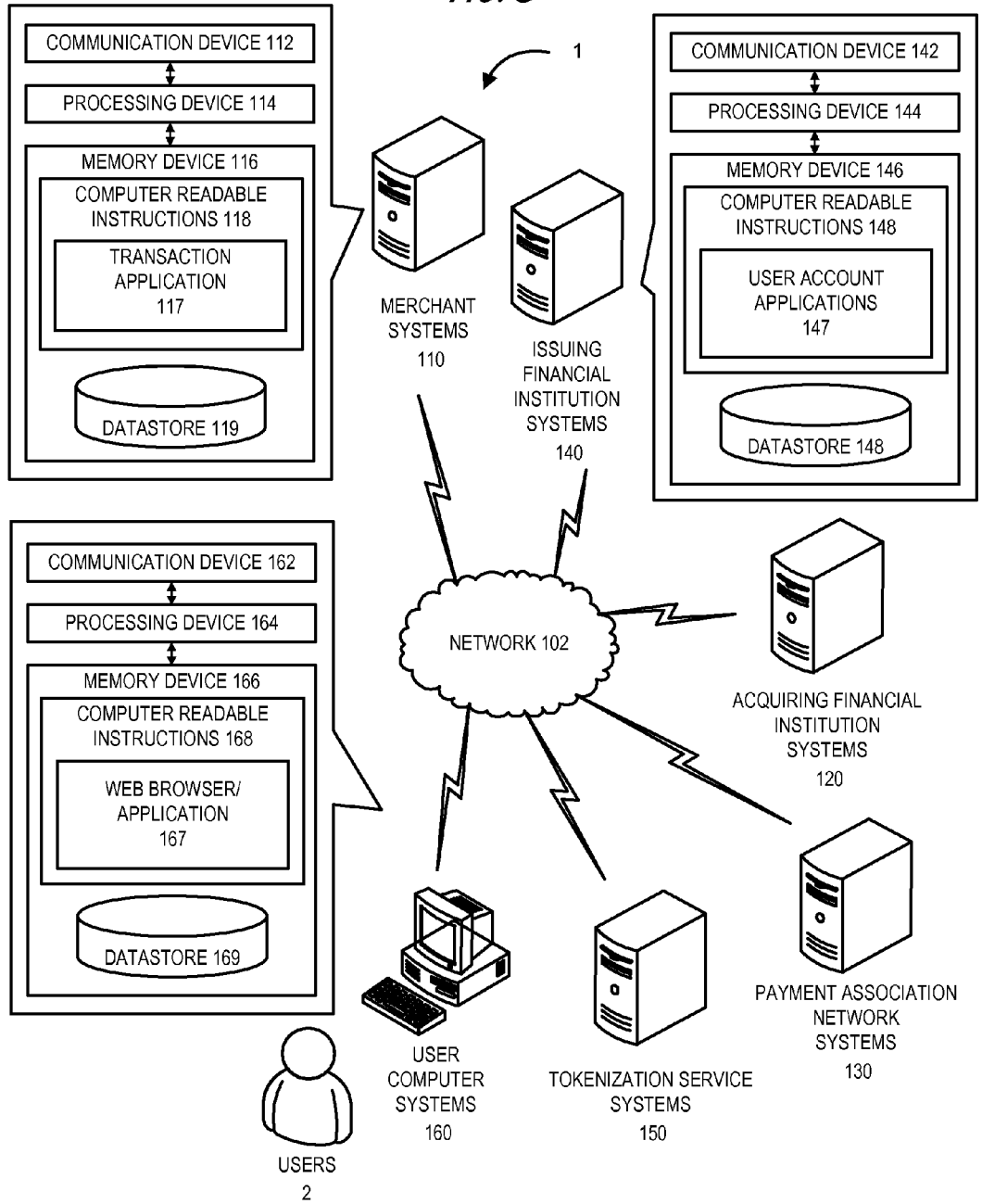

Having thus described embodiments of the invention in general terms, reference will now be made to the accompanying drawings, wherein:

FIG. 1 illustrates a high level process flow for a entering into a transaction using a token, in accordance with one embodiment of the present invention;

FIG. 2 illustrates a high level process flow for a entering into a transaction using a token, in accordance with one embodiment of the present invention;

FIG. 3 illustrates a high level process flow for a entering into a transaction using a token, in accordance with one embodiment of the present invention;

FIG. 4 illustrates a shared token process for a collaborative group of users, in accordance with one embodiment of the present invention; and FIG. 5 illustrates a block diagram for a tokenization system environment, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a "financial institution" or "bank," one of ordinary skill in the art will appreciate that other embodiments of the invention may involve other businesses or institutions that take the place of or work in conjunction with the financial institution or bank to perform one or more of the processes or steps described herein as being performed by a financial institution or bank. Still in other embodiments of the invention the financial institution or bank described herein may be replaced with other types of businesses or institutions that offer services to users.

The present invention relates to tokenization, which is generally described in the area of financial transactions as utilizing a "token" (e.g., an alias, substitute, surrogate, or other like identifier) as a replacement for sensitive account information, and in particular account numbers. As such, tokens or portions of tokens may be used as a stand in for a user account number, user name, pin number, routing information related to the financial institution associated with the account, security code, or other like information relating to the user account. The one or more tokens may then be utilized as a payment instrument to complete a transaction. The one or more tokens may be associated with one or more payment devices directly or within one or more digital wallets associated with the payment devices. In other embodiments, the tokens may be associated with electronic transactions that are made over the Internet instead of using a physical payment device. Utilizing a token as a payment instrument instead of actual account information, and specifically an account number, improves security, and provides flexibility and convenience in controlling the transactions, controlling accounts used for the transactions, and sharing transactions between various users.

Tokens may be single-use instruments or multi-use instruments depending on the types of controls (e.g., limits) initiated for the token, and the transactions in which the token is used as a payment instrument. Single-use tokens may be utilized once, and thereafter disappear, are replaced, or are erased, while multi-use tokens may be utilized more than once before they disappear, are replaced, or are erased.

Tokens may be 16-digit numbers (e.g., like credit, debit, or other like account numbers), may be numbers that are less than 16-digits, or may contain a combination of numbers, symbols, letters, or the like, and be more than, less than, or equal to 16-characters. In some embodiments, the tokens may have to be 16-characters or less in order to be compatible with the standard processing systems between merchants, acquiring financial institutions (e.g., merchant financial institution), card association networks (e.g., card processing companies), issuing financial institutions (e.g., user financial institution), or the like, which are used to request authorization, and approve or deny transactions entered into between a merchant (e.g., a specific business or individual user) and a user. In other embodiments of the invention, the tokens may be other types of electronic information (e.g., pictures, codes, or the like) that could be used to enter into a transaction instead of, or in addition to, using a string of characters (e.g., numbered character strings, alphanumeric character strings, symbolic character strings, combinations thereof, or the like).

A user may have one or more digital wallets on the user's payment device. The digital wallets may be associated specifically with the user's financial institution, or in other embodiments may be associated with a specific merchant, group of merchants, or other third parties. The user may associate one or more user accounts (e.g., from the same institution or from multiple institutions) with the one or more digital wallets. In some embodiments, instead of the digital wallet storing the specific account number associated with the user account, the digital wallet may store a token or allow access to a token (e.g., provide a link or information that directs a system to a location of a token), in order to represent the specific account number during a transaction. In other embodiments of the invention, the digital wallet may store some or all of the user account information (e.g., account number, user name, pin number, or the like), including the user account number, but presents the one or more tokens instead of the user account information when entering into a transaction with a merchant. The merchant may be a business, a person that is selling a good or service (hereinafter "product"), or any other institution or individual with which the user is entering into a transaction.

The digital wallet may be utilized in a number of different ways. For example, the digital wallet may be a device digital wallet, a cloud digital wallet, an e-commerce digital wallet, or another type of digital wallet. In the case of a device digital wallet the tokens are actually stored on the payment device. When the device digital wallet is used in a transaction the token stored on the device is used to enter into the transaction with the merchant. With respect to a cloud digital wallet the device does not store the token, but instead the token is stored in the cloud of the provider of the digital wallet (or another third party). When the user enters into a transaction with a merchant, transaction information is collected and provided to the owner of the cloud to determine the token, and thus, how the transaction should be processed. In the case of an e-commerce digital wallet, a transaction is entered into over the Internet and not through a point of sale terminal. As was the case with the cloud digital wallet, when entering into a transaction with the merchant over the Internet the transaction information may be captured and transferred to the wallet provider (e.g., in some embodiments this may be the merchant or another third party that stores the token), and the transaction may be processed accordingly.

Specific tokens, in some embodiments, may be tied to a single user account, but in other embodiments, may be tied to multiple user accounts, as will be described throughout this application. In some embodiments a single tokens could represent multiple accounts, such that when entering into a transaction the user may select the token (or digital wallet associated with the token) and select one of the one or more accounts associated with the token in order to allocate the transaction to a specific account. In still other embodiments, after selection of the token by the user the system may determine the best account associated with the token to use during the transaction (e.g., most cash back, most rewards points, best discount, or the like). In addition, the tokens may be associated with a specific digital wallet or multiple digital wallets as desired by the institutions or users.

Moreover, the tokens themselves, or the user accounts, individual users, digital wallets, or the like associated with the tokens, may have limitations that limit the transactions that the users may enter into using the tokens. The limitations may include, limiting the transactions of the user to a single merchant, a group of multiple merchants, merchant categories, single products, a group a products, product categories, transaction amounts, transaction numbers, geographic locations, or other like limits as is described herein.

FIGS. 1 through 3 illustrate a number of different ways that the user 2 may use one or more tokens in order to enter into a transaction, as well as how the parties associated with the transaction may process the transaction. FIG. 1, illustrates one embodiment of a token system process 1, wherein the token system process 1 is used in association with a tokenization service 50. The tokenization service 50 may be provided by a third-party institution, the user's financial institution, or another institution involved in a transaction payment process. As illustrated in FIG. 1 (as well as in FIGS. 2 and 3), a user 2 may utilize a payment device 4 (or in other embodiments a payment instrument over the Internet) to enter into a transaction. FIG. 1 illustrates the payment device 4 as a mobile device, such as a smartphone, personal digital assistant, or other like mobile payment device. Other types of payment devices 4 may be used to make payments, such as but not limited to an electronic payment card, key fob, a wearable payment device (e.g., watch, glasses, or the like), or other like payment devices 4. As such, when using a payment device 4 the transaction may be made between the point of sale (POS) and the payment device 4 by scanning information from the payment device 4, using near field communication (NFC) between the POS and the payment device 4, using wireless communication between the POS and the payment device 4, or using another other type of communication between the POS and the payment device 4. When entering into an e-commerce transaction over the Internet, for example using the payment device 4 or another device without a POS, a payment instrument (e.g., a payment application that stores the token) may be used to enter into the transaction. The payment instrument may be the same as the token or digital wallet associated with the payment device 4, except they are not associated with specific payment device. For example, the token or digital wallet may be associated with a payment application that can be used regardless the device being used to enter into the transaction over the Internet.

The token can be associated directly with the payment device 4, or otherwise, through one or more digital wallets associated with the payment device 4. For example, the token may be stored on one or more payment devices 4 directly, and as such any transaction entered into by the user 2 with the one or more payment devices 4 may utilize the token. Alternatively, the payment device 4 may have one or more digital wallets stored on the payment device 4 that allow the user 2 to store one or more user account numbers, or tokens associated with the user account numbers, on the one or more digital wallets. The user may select a digital wallet or account within the digital wallet in order to enter into a transaction using a specific type of customer account. As such, the digital wallets may be associated with the user's issuing financial institutions 40, other financial institutions, merchants 10 with which the user enters into transactions, or a third party institutions that facilitates transactions between users 2 and merchants 10.

As illustrated in FIG. 1, a tokenization service 50 may be available for the user 2 to use during transactions. As such, before entering into a transaction, the user 2 may generate (e.g., create, request, or the like) a token in order to make a payment using the tokenization service 50, and in response the tokenization service 50 provides a token to the user and stores an association between the token and the user account number in a secure token and account database 52. The token may be stored in the user's payment device 4 (e.g., on the digital wallet) or stored on the cloud or other service through the tokenization service 50. The tokenization service 50 may also store limits (e.g., geographic limits, transaction amount limits, merchant limits, product limits, any other limit described herein, or the like) associated with the token that may limit the transactions in which the user 2 may enter. The limits may be placed on the token by the user 2, or another entity (e.g., client, administrator, person, company, or the like) responsible for the transactions entered into by the user 2 using the account associated with the token. The generation of the token may occur at the time of the transaction or well in advance of the transaction, as a one-time use token or multi-use token.

After or during creation of the token the user 2 enters into a transaction with a merchant 10 using the payment device 4 (or payment instrument over the Internet). In some embodiments the user 2 may use the payment device 4 by itself, or specifically select a digital wallet or user account stored within the digital wallet, to use in order to enter into the transaction. The token associated with payment device, digital wallet, or user account within the wallet is presented to the merchant 10 as payment in lieu of the actual user account number and/or other user account information. The merchant 10 receives the token, multiple tokens, and/or additional user account information for the transaction. The merchant 10 may or may not know that the token being presented for the transaction is a substitute for a user account number or other user account information. The merchant also captures transaction information (e.g., merchant, merchant location, transaction amount, product, or the like) related to the transaction in which the user 2 is entering with the merchant 10.

The merchant 10 submits the token (as well as any user account information not substituted by a token) and the transaction information for authorization along the normal processing channels (also described as processing rails), which are normally used to process a transaction made by the user 2 using a user account number. In one embodiment of the invention the acquiring financial institution 20, or any other institution used to process transactions from the merchant 10, receives the token, user account information, and transaction information from the merchant 10. The acquiring financial institution 20 identifies the token as being associated with a particular tokenization service 50 through the token itself or user account information associated with the token. For example, the identification of the tokenization service 50 may be made through a sub-set of characters associated with the token, a routing number associated with the token, other information associated with the token (e.g., tokenization service name), or the like. The acquiring financial institution 20 may communicate with the tokenization service 50 in order to determine the user account number associated with the token. The tokenization service 50 may receive the token and transaction data from the acquiring financial institution 20, and in response, provide the acquiring financial institution 20 the user account number associated with the token as well as other user information that may be needed to complete the transaction (e.g., user name, issuing financial institution routing number, user account number security codes, pin number, or the like). In other embodiments, if limits have been placed on the token, the tokenization service 50 may determine whether or not the transaction information meets the limits and either allows or denies the transaction (e.g., provides the user account number or fails to provide the user account number). The embodiment being described occurs when the token is actually stored on the payment device 4. In other embodiments, for example, when the actual token is stored in a cloud the payment device 4 may only store a link to the token or other token information that allows the merchant 10 or acquiring financial institution to acquire the token from a stored cloud location.

If the acquiring financial institution 20 receives the user account number from the tokenization service 50 (e.g., the tokenization service indicates that the transaction meets the limits), then the acquiring financial institution 20 thereafter sends the user account number, the other user information, and the transaction information directly to the issuing financial institution 40, or otherwise indirectly through the card association networks 30. The issuing financial institution 40 determines if the user 2 has the funds available to enter into the transaction, and if the transaction meets other limits on the user account, and responds with approval or denial of the transaction. The approval runs back through the processing channels until the acquiring financial institution 20 provides approval or denial of the transaction to the merchant 10 and the transaction between the merchant 10 and the user 2 is completed. After the transaction is completed the token may be deleted, erased, or the like if it is a single-use token, or stored for further use if it is a multi-use token.

Instead of the process described above, in which the acquiring financial institution 20 requests the token from the tokenization service 50, in some embodiments the tokenization service 50 may receive the transaction request and transaction information from the merchant 10 or acquiring financial institution 20. Instead of providing the account number to the acquiring financial institution 20, the tokenization service 50 may send the transaction request and transaction information to the issuing financial institution 40 directly, or indirectly through the payment association networks 30.

The embodiment illustrated in FIG. 1 prevents the user account number and other user information from being presented to the merchant 10; however, the tokenization service 50, acquiring financial institution 20, the card association networks 30, and the issuing financial institution 40 may all utilize the actual user account number and other user information to complete the transaction.

FIG. 2 illustrates another embodiment of a token system process 1, in which the user 2 may utilize a payment device 4 (or payment instrument over the Internet) to enter into transactions with merchants 10 utilizing tokens instead of user account numbers. As illustrated in FIG. 2, the user may have one or more tokens, which may be associated with the payment device 4, one or more digital wallets within the payment device 4, or one or more user accounts associated with the digital wallets. The one or more tokens may be stored in the user's payment device 4 (or on the digital wallet), or stored on a cloud or other service through the issuing financial institution 40 or another institution. The user 2 may set up the digital wallet by communicating with the issuing financial institution 40 (e.g., the user's financial institution) to request a token for the payment device, either for the device itself, or for one or more digital wallets or one or more user accounts stored on the payment device. As previously discussed, a wallet may be specifically associated with a particular merchant (e.g., received from the merchant 10) and include one or more tokens provided by the issuing financial institution 40 directly (or through the merchant as described with respect to FIG. 3). In other embodiments, the issuing financial institution 40 may create the digital wallet for the user 2 (e.g., through a wallet created for a business client or retail client associated with the user 2) and include one or more tokens for various types of transactions, products, or the like. The issuing financial institution 40 may store the tokens, the associated user account information (e.g., including the user account number), and any limits on the use of the tokens, as was previously described with respect to the tokenization service 50 in FIG. 1. In one embodiment the tokens may include user account information or routing information within the token or tied to the token, which allows the merchants 10 and other institutions in the payment processing systems to route the token and the transaction information to the proper institutions for processing. In other embodiments a tokenization routing database 32 may be utilized to determine where to route a transaction using a token, as described in further detail later.

The user 2 may enter into a transaction with the merchant 10 using a payment device 4 (or a payment instrument through the Internet). In one embodiment the user 2 may enter into the transaction with a token associated with the payment device 4 itself (or a payment instrument through the Internet). In other embodiments, a specific digital wallet and/or a specific account within the digital wallet may be selected for a particular merchant with whom the user 2 wants to enter into a transaction. For example, the user 2 may select "wallet 1" to enter into a transaction with "merchant 1" and "token 1" to utilize a specific account. The merchant 10 identifies the token, and sends the token and the transaction information to the acquiring financial institution 20. If the token has routing information the acquiring financial institution 20 may route the token and transaction data to the issuing financial institution 40 directly or through the card association networks 30. In situations where the token does not have associated routing information, the acquiring financial institution 20 may utilize a tokenization routing database 32 that stores tokens or groups of tokens and indicates to which issuing financial institutions 40 the tokens should be routed. One or more of the acquiring financial institutions 20, the card association networks 30, and/or the issuing financial institutions 40 may control the tokenization routing database in order to assign and manage routing instructions for tokenization across the payment processing industry. The tokenization routing database 32 may be populated with the tokens and the corresponding issuing financial institutions 40 to which transactions associated with the tokens should be routed. However, in some embodiments no customer account information would be stored in this tokenization routing database 32, only the instructions for routing particular tokens may be stored.

Once the token and transaction details are routed to the issuing financial institution 40, the issuing financial institution 20 determines the user account associated with the token through the use of the token account database 42. The financial institution determines if the funds are available in the user account for the transaction and if the transaction information meets other limits by comparing the transaction information with the limits associated with the token, the user account associated with the token, or other limits described herein. If the transaction meets the limits associated with the token or user account, then the issuing financial institution 20 allows the transaction. If the transaction information does not meet one or more of the limits, then the issuing financial institution 20 denies the transaction. The issuing financial institution sends a notification of the approval or denial of the transaction back along the channels of the transaction processing system to the merchant 10, which either allows or denies the transaction.

The embodiment illustrated in FIG. 2 allows the user and the financial institution to shield the user's account number and other user information from all of the entities in the payment processing system because the merchant 10, acquiring merchant bank 20, payment association networks 30, or other institutions in the payment processing system only use the token and/or other shielded user information to process the transaction. Only the issuing financial institution 40 has the actual account number of the user 2.

FIG. 3 illustrates another embodiment of the token system process 1, in which the user 2 may utilize a payment device 4 (or payment instrument over the Internet) to enter into transactions with a merchant 10 utilizing a token instead of a user account number and/or other user account information. As illustrated in FIG. 3, the user 2 may have one or more tokens associated with the payment device 2, the one or more digital wallets, or one or more user accounts within the digital wallets. The one or more tokens may be stored in the user's payment device 4 (or within the digital wallet), or stored on a cloud or other service through the issuing financial institution 40 or another institution. The user 2 may set up the digital wallet by communicating with the issuing financial institution 40 (e.g., the user's financial institution) and/or the merchant 10 to request a token for the payment device 4, either for the payment device 4 itself, for the one or more digital wallets stored on the payment device 4, or for user accounts within the digital wallet. The financial institution 40 may have a dedicated group of tokens that are associated with a specific merchant, and as such the merchant 10 and the issuing financial institution 40 may communicate with each other to provide one or more tokens to the user 2 that may be specifically associated with the merchant 10. For example, the issuing financial institution may provide a set of tokens to "merchant 1" to associate with "wallet 1" that may be used by one or more users 2. As such "Token 10" may be associated with "wallet 1" and be specified only for use for transactions with "merchant 1."

The merchant 10 may provide the specific tokens from the financial institution 40 to the user 2, while the financial institution 40 may store the user account information with the token provided to the user 2. The financial institution may communicate directly with the user 2, or through the merchant 10 in some embodiments, in order to associate the token with the user 2. Since the merchant 10 provides, or is at least notified by the financial institution 40, that a specific token, or groups of tokens, are associated with a specific issuing financial institution 40, then the merchant 10 may associate routing information and transaction information with the token when the user 2 enters into a transaction with the merchant 10 using the token.

The merchant 10 passes the token (and potentially other user account information), routing information, and transaction information to the acquiring financial institution 20 using the traditional payment processing channels. The acquiring financial institution 20, in turn, passes the token (and potentially other user account information) and transaction information to the issuing financial institution 40 directly, or indirectly through the payment association networks 30 using the routing information. The issuing financial institution 40 accesses the token and account database 42 to identify the user account associated with the token and determines if the transaction information violates any limits associated with the token or the user account. The issuing financial institution 40 then either approves or denies the transaction and sends the approval or denial notification back through the payment processing system channels to the merchant 10, which then notifies the user 2 that the transaction is allowed or denied.

As is the case with the token system process 1 in FIG. 2, the token system process 1 in FIG. 3 allows the user 2 and the financial institution 40 to shield the user's account number and other user information from all of the entities in the payment processing system because the merchant 10, acquiring merchant bank 20, payment association networks 30, or other institutions in the payment processing system only use the token and/or other shielded user information to process the transaction. Only the issuing financial institution 40 has the actual account number of the user 2.

The embodiments of the invention illustrated in FIGS. 1 through 3 are only example embodiments of the invention, and as such it should be understood that combinations of these embodiments, or other embodiments not specifically described herein may be utilized in order to process transactions between a user 2 and merchant 10 using one or more tokens as a substitute for user account numbers or other user account information, such that the merchant 10, or other institutions in the payment processing system do not have access to the actual user accounts or account information.

As briefly discussed above, if the issuing financial institution 40 creates the digital wallet not only does the issuing financial institution 40 receive transaction information along the normal processing channels, but the financial institution 50 may also receive additional transaction information from the user 2 through the digital wallet using the application program interfaces (APIs) or other applications created for the digital wallet. For example, geographic location information of the user 2, dates and times, product information, merchant information, or any other information may be transmitted to the issuing financial institution 40 through the APIs or other applications to the extent that this information is not already provided through the normal transaction processing channels. This additional transaction information may assist in determining if the transactions meet or violate limits associated with the tokens, user accounts, digital wallets, or the like.

Alternatively, if the merchant 10 or another institution, other than the issuing financial institution 40, provides the digital wallet to the user 2, the issuing financial institution 40 may not receive all the transaction information from the traditional transaction processing channels or from the digital wallet. As such, the issuing financial institution 40 may have to receive additional transaction information from another application associated with the user 2 and compare the transaction information received through the traditional channels in order to associate the additional information with the transaction. In other embodiments, the issuing financial institutions 40 may have partnerships with the merchants 10 or other institutions to receive additional transaction information from the digital wallets provided by the merchants or other institutions when the users 2 enter into transactions using the digital wallets.

Moreover, when there is communication between the digital wallets of the users 2 and the issuing financial institution 40 or another institution, transactions in which the user 2 may enter may be pre-authorized (e.g., pre-qualified) to determine what accounts (e.g., tokens) may be used to complete the transaction, without having to arbitrarily choose an account for the transaction. In the case when there are multiple digital wallets or multiple accounts, the account that is pre-authorized or the account that provides the best rewards may be automatically chosen to complete the transactions.

Additional embodiments of the invention will now be described in further detail in order to provide additional concepts and examples related to how tokens may be utilized in these illustrated token system processes 1 or in other token system processes not specifically described in FIGS. 1 through 3.

FIG. 4 illustrates a token collaboration process flow 200, in accordance with one embodiment of the invention. As illustrated by block 202 of FIG. 4, a shared token is created or requested for the collaboration of the users 2. An institution (e.g., issuing financial institution, third party institution, or the like) may create the token for a business client or retail client. In one embodiment, the business client or retail client may request the token from the institution. For example, in one embodiment the business client may request a token for a collaborative group of employee users 2 for use with one or more customers of the business client during one or more business trips, for one or more projects, for one or more transactions, or the like. With respect to the retail client, the retail client may request a token for a collaborative group of retail users 2 (e.g., group of family members, group of friends on a trip, or the like) for one or more trips, for use on one or more projects, for one or more transactions, or the like. In other embodiments of the invention, the business client or retail client may create the token and notify the institution storing the account information of the token created. As such, the institution may store the relationship between the token and the account information to allow use of the token in transactions.

Block 204 of FIG. 4 illustrates that the requesting business client or retail client may appoint an administrator to oversee the use of the shared token. For example, in the case of a business client, the business client may associate one or more administrators (e.g., employees) with the token to set and control the spending of a collaborative group employee users 2 that are granted access to use the token. In the case of a retail client, the retail client may associate one or more administrators (e.g., parents, trustee, legal guardian, or user 2 that creates or is a part of a group of users 2, or the like) with the token to set and control the spending of the collaborative group of retail users 2 (e.g., kids, grandparents, any other dependents, group of users 2, or the like) that are granted access to use the token. The administrators may be responsible for creating, adding, or removing users 2 from the collaborative group of users 2, setting limits on the transactions in which the users 2 may enter, or the like. In some embodiments there may be more than one administrator for a shared token used by a collaborative group of users 2. Moreover, the administrators may also be users 2 within the collaborative group of users 2.

FIG. 4 further illustrates in block 206 that the shared token is associated with an account. As previously discussed, a shared token may be associated with an account by the issuing financial institution 40 or a third party (e.g., tokenization service 50) independent of the issuing financial institution 40, for a business client or a retail client. For example, in the case of a business client, the token may be associated with a business account (e.g., a corporate card) that a collaborative group of employee users 2 may utilize in order to enter into transactions related to the business. In other embodiments of the invention, in the case of a retail client, the token may be associated with an account of the administrator (e.g., parents may associate the tokens with one or more accounts owned by the parents) and/or an account of another user 2 within the collaborative group of users 2. In some embodiments, the token may be associated with multiple accounts that may be debited or charged equally, or charged based on assigned limits, when a transaction is entered into by one or more of the collaborative group of users 2. However, in some embodiments of the invention the account associated with a token may be a new account that is created just for the collaborative group of users 2 and is funded by the collaborative group of users 6, as is discussed in further detail below. In some embodiments, the accounts may be added or removed from being associated with the token. As such, in some embodiments, a single account associated with the token may be changed or removed and a new account may be associated with a token that is already in place. For example, if the account number is misappropriated and a new account number is created, the new account number may be associated with the token that is already being used by the collaborative group of users.

As illustrated by block 208 one or more users are associated with the shared token, or the account associated with the shared token. For example, the user 2 (e.g., employee users, retail users, or the like) may be authorized as users 2 of the token (e.g., by the administrator) or otherwise associated with the account with which the shared token is associated. For example, in some embodiments user information may be associated with the shared token or the account, such as a user name, user identification number, payment device 4 identifier, digital wallet identifier, or the like. In other embodiments the administrators (e.g., of the business client or retail client) may determine what users 2 may download, access, or otherwise utilize the shared token to enter into transactions, by adding the user information to a list that allows the users 2 to gain access to the shared token. In other embodiments of the invention, the business client or retail client may utilize a messaging system (e.g., e-mail, text message, online banking account message, social media message, or other like message over another communication channel) to send a notification message to the one or more users 2 indicating that the users 2 may join a collaborated group of users 2. In still other embodiments, the users 2 may send a request to join a collaborative group of users 2 to the issuing financial institution 40. As such, in some embodiments the users 2 may be manually or automatically added to the collaborative group of users 2 before being asked to join a collaborative group of users 2, or provided with the shared token or access to the shared token. In other embodiments the users 2 may be added only after the users 2 are sent a message to join a collaborative group of users 2, and acceptance of the invitation join is received from the user 2.

As illustrated by block 210, the shared tokens or access to the shared tokens may be distributed to the plurality of users 2. In some embodiments of the invention, the business client or retail client may again utilize a messaging system to send a notification message to the one or more users 2 illustrating how to join a collaborated group of users 2, and be allowed to the use the shared token for transactions. As previously discussed, the collaborative group of users 2 may be formed to jointly utilize a shared token for transactions related to one or more customers, one or more specific transactions, one or more projects, one or more trips (e.g., business trips, vacations, or the like). The message or another like communication may securely provide the shared token to the users 2, or in the alternative may provide the users 2 the necessary token information to access the shared tokens when entering into transactions. As such, the users 2 may download, access, or otherwise identify the shared token. The actual shared tokens or the shared token information used to access the tokens may be stored within the users' payment devices 4, or stored in an application that may be accessed by the users' payment devices 4.

Block 212 of FIG. 4 illustrates that the shared token, or otherwise the shared token information that identifies where to access the shared token to enter into a transaction, may be stored in the payment device 4. For example, in some embodiments the payment device 4 or a digital wallet within the payment device 4 may store the token information (e.g., store the actual token numbers, store a link to the token numbers, or otherwise communicate with a system that stores the token information, such as a cloud system) instead of the actual account number or other account information with which the token is associated. In other embodiments, the shared token or shared token information may be stored in an application that can be used for in-person transactions at a POS or for e-commerce transactions. In still other embodiments of the invention, the shared token or shared token information may be stored on multiple payment devices (e.g., personal mobile device, business mobile device, electronic credit card, or any other like device discussed or not discussed herein) of a single user 2. As such, the user 2 may enter into transactions using the same shared token over various payment devices 4.

Block 214 illustrates that the account associated with the shared token is funded. In some embodiments of the invention, the account may be a credit account, a debit account, or another like account. Furthermore, the shared token may be associated with an account that is already funded, such as a corporate account or family account that already has associated funds. As such, additional funds may be made available or added to the account, if needed. In other embodiments, the account may be a new account, and as such the account may need to be funded in order to enter into transactions using the shared token. As such, in one embodiment the account may be a credit account, and funding the account indicates placing a spending account limit on the account. The amount of funds available in the account may be based on the credit worthiness of the users 2 associated with the account, or the client (e.g., business client), for which the account is being used. The amount of funds available may also be based on collateral associated with the account by the users 2. Each user may be responsible for a portion of the maximum spending limit of the account, or in other embodiments may be responsible for the entire spending limit jointly and severally. In other embodiments of the invention the account may be a debit account, and funding the account indicates debiting funds from the one or more users 2 (or other funding sources) into the account. Each user associated with the account may provide the same amount to the account (e.g., $500 each), or each user may provide different amounts. The amount of funds contributed to the account (e.g., debit account), or attributed to the account (e.g., credit account), by each user 2 may be tracked in order to determine how much the users 2 may spend, or how much should be returned to the users 2 after they leave the collaborative group of users 2. In some embodiments one or more users 2 may contribute funds on a recurring basis. In still other embodiments, if one or more users 2 enter into transactions without using the shared token (e.g., use other user accounts) the one or more users 2 may be reimbursed using funds from the account associated with the shared token.

Block 216 of FIG. 4 illustrates that one or limits are placed on the shared token. As such, the limits may be applied to any shared token regardless of how many users 4 or payment devices 4 are associated with the shared token (e.g., tokens associated with different users 2 or tokens associated with multiple payment devices 4 associated with the same users 2). Alternatively, or in addition to the shared token limits, block 218 illustrates that one or more limits are placed on the users 2 (e.g., individual users, groups of users, or the like) within the collaborative group of users 2. As such, the limits may be applied to the users 2 regardless of the one or more shared tokens associated with the users 2 or the payment devices 4 used by the users 4. In other embodiments of the invention the limits may be placed on the payment devices 4 or digital wallets within the payment devices 4. Examples of the limits may include the maximum aggregate amount spent using the account, the maximum single transaction amount, geographic limits (e.g., specific merchant, area, zip code, city, county, state, country, radius from a specified point, route along one or more roads, or other like geographic location), merchant limits, product limits, or the like. Additional limits may include time period limits, such as hourly, time of day, daily, weekly, monthly, or custom timeframes (e.g., every other day, every Saturday, or the like). All the different types of limits may be approval limits or denial limits, such that for example the limits may include allowing transactions in a specific geographic area and/or for a particular time, or denying transactions in a specific geographic area and/or for a particular time. In other embodiments of the invention the client, or administrators associated with the client, may have the ability to lock, unlock, suspend, or the like the use of the shared token or digital wallet. The limits are discussed in further detail below.

When the limits are placed on the shared token, if the token becomes misappropriated and replaced with another shared token, the limits maybe lost or have to be transferred to the new replacement shared token. As such, in some embodiments when a token is replaced the limits are transferred to the new token, while in other embodiments the limits may have to be reinstituted. In other embodiments, the limits may be associated with the individual users 2, groups of users 2, or the like, which allows the different limits to be placed on the users 2 globally, on multiple users 2, or on individual users 2, as desired by the client. Moreover, in one embodiment a user 2 may have a first shared token associated with a first collaborative group of users 2, and a second shared token associated with a second collaborative group of users 2. In some embodiments, limits may be placed globally on the use of both tokens, on the tokens themselves, groups of users 2 within the tokens, or on the individual users 2. It should be understood that any combination of limits described herein may be used to set various limits.

Block 220 of FIG. 4 illustrates that an institution receives an indication that a shared token is being used in a transaction. Also, as illustrated in block 222, the institution also receives transaction information associated with the transaction. The institution that receives the indication of the transaction, and/or the transaction information, was previously described with respect to FIGS. 1-3. As such, the institution may be the issuing financial institution 40, the tokenization service 50 institution, and/or the client that sets the limits. In the embodiment in which the client sets and/or stores the limits, the issuing financial institution 40 or the tokenization service 50 institution (e.g., through the digital wallet or another application) may communicate with the client to determine, or otherwise access, the limits stored at the client, and determine if the transaction should be allowed or denied before allowing or denying the transaction. In other embodiments, the merchant 10 (e.g., through the digital wallet or another application) may communicate with the client to determine, or otherwise access, the limits stored at the client before passing the transaction on for processing or before allowing or denying the transaction.

As such, as previously discussed with respect to FIGS. 1 through 3, or furthermore with respect to blocks 220 and 222 in FIG. 4, a determination is made as to if the transaction associated with the shared token being used meets the limits, as illustrated by block 224. In one embodiment the highest levels of limits (e.g., global limits) may be asserted first, then the next levels of limits (e.g., group limits, sub-group limits) may be asserted next, then the individual level of limits (e.g., individual user, token, accounts in the digital wallets, or the like limits) may be asserted in order to determine if the transaction should be allowed or denied. In other embodiments of the invention, the inverse may occur, and as such, the individual limits (e.g., user limits, token limits, or the like) may be asserted first, then the sub-group or group limits, and finally the global limits. In other embodiments of the invention, the limits may be asserted in any order.

As illustrated by block 226, if the transaction (e.g., transaction information) fails to meet the limits (e.g., violates the limits) the transaction may be denied. Alternatively, if the transaction (e.g., transaction information) meets the limits (e.g., passes the limits) the transaction may be allowed.

In some embodiments, a new user 2 may be periodically added to the collaborative group of users 2 as illustrated by block 230 in FIG. 4. As such, in some embodiments, new users 2 are added as was described with respect to blocks 208 to 212 above. As illustrated by block 232 the account associated with the shared token may receive additional funding from the new user 2 as was previously discussed with respect to block 214.

Block 234 illustrates that the shared token may be disassociated from the user 2 (e.g., user payment device 4, user digital wallet, or the like) in order to remove the user 2 from the collaborated group of users 2. The administrator of the client (e.g., business client, retail client, or the like) may prevent one or more users 2 in the group of users 2 from utilizing the shared token. For example, the administrator may remove the shared token or link to the shared token from the payment or digital wallet of the user 2. In another embodiment, the administrator may block of the use of the token by the specific user 2. The administrator may also replace the token for all of the other users 2 in the collaboration group except for the user 2 that is to be removed from the collaboration group. In still other embodiments, the token may remain with the user 2, however, when user information is captured during the transaction and sent for authorization the transaction may be denied by the institution storing the request to prevent the user 2 from continuing to use the shared token. In other examples, instead of the shared token being disassociated from the user 2 the token information that links the payment device (e.g., digital wallet) to the shared token may be disassociated from the user 2 (e.g., the payment device 4).

Block 236 illustrates that when the shared token or link to the shared token is dissociated from the user 2, or the user 2 is otherwise prevented from using the shared token a portion of the user's remaining funds contributed to the account may be returned to the user 2. As discussed, the purchases made by each user 2 may be tracked, and in one embodiment the disassociated user 2 is refunded a portion of his contribution, based in part on the disassociated user's contribution, the purchases made by the dissociated user 2, distributions taken by the dissociated user 2 in the past, the purchases made by other user's associated with the shared token, the limits related to use of the funds by the users 2, or the like.

As illustrated by block 238, in some embodiments of the invention the limits on the tokens, users 2, payments devices 4, accounts, or the like may be edited as the business clients, retail clients, or the like (e.g., administers of the client) have changing needs related to controlling the transactions of the users.

In one embodiment, the tokens, accounts, users 2, limits, or the like may be created and assigned as described herein through the use of graphical interfaces that allows the administrator (e.g., or other person) within the business client, retail client, or the like to manage the use of the shared token as desired.

Embodiments related to FIG. 4 have been described herein as being related to a shared token that may be utilized by a collaborative group of users 2. In other embodiments of the invention there may be more than one shared token associated with a user 2, payment device 4 of the user 2, a digital wallet associated with the payment device 4, or the like.

In still other embodiments of the invention, instead of using a single shared token for the collaborative group of users 2, multiple shared tokens may be provided to the collaborative group of uses 2. The multiple shared tokens may be associated with a single account or multiple accounts for the collaborative group of users 2. As such, when entering into a transaction the user 2 may select the token, account, or the like that the user 2 would like to utilize in the transaction. Moreover, if the token associated with a single user becomes misappropriated then only the single token for the specific user 2 is replaced instead of have to replace the shared with all of the users 2.

The limits discussed herein may include limiting a transaction by a predetermined number of merchants 10 (e.g., a finite number of allowable/deniable merchants 10), a particular group of merchants 10 or one or more merchant categories, (e.g., only grocers), a product type, a group of products or product categories (e.g., only food or gasoline purchases), an amount limit associated with the transaction (e.g., no transaction amounts above a predetermined threshold are allowed, or a minimum transaction amount), a history of purchases, user behavior, a frequency of purchases, a geographic location (e.g., no transactions allowed outside of a predetermined range, specific merchant, area, zip code, city, county, state, country, radius from a specified point, route along one or more roads), a period of time (a time, a day, a month, a year, a quarter) or the like. One or more limits may be assigned singularly or in combination with other limits to either one or more users 2, the token, a device or application associated with a user 2 or a token, an account, a digital wallet, or the like. The present invention may further be configured to determine a time zone that the user, a device associated with the user, or a transaction is in currently. The limits may be defined or configured by the user 2, by an administrator, by an agent associated with the entity, by a third party, or the like based on need. Configuring the limits may require authentication (e.g., a password), device authentication, or another type of authentication. The entity instituting the limits may be enabled to assign the limits to the user 2, the token, or both, or a device, an account, a digital wallet, or the like.

For example, a child may be limited by a $10-a-day weekday spending budget that is suspended on the weekends. However, the weekend may impose different limits to the token associated with the child's account, as it may be limited to transactions with merchants who sell food, gasoline, wherein entertainment venues are restricted. These limits may be defined by the parent through the methods described herein.

In some embodiments, the one or more limits may be based on an IP (internet protocol) address associated with the IP gateway. Typically, an IP gateway is a node that allows communication between networks. An IP gateway, sometimes referred to as a router of internet access device (IAD), can be as simple as a computer that controls the dataflow between two networks. The one or more limits may be based on restricting data flow between the user's IP address and one or more specific IP addresses of one or more IP gateways associated with one or more merchants. For example, the apparatus may be configured to limit the use of a token to conduct an e-commerce transaction with a merchant based on an IP address of the IP gateway associated with the merchant's network. In one aspect, an e-commerce transaction may include a transmission of transaction information from the user's web browser to a merchant's IP webserver through the merchant's IP gateway. In response, the apparatus may be configured to detect the IP address of the IP gateway associated with the merchant and the IP address of the IP gateway associated with the customer conducting the transaction. Once the IP address is detected, the apparatus may determine if the IP address is in accordance with the one or more limits. In response to determining if the IP address is in accordance with the one or more limits, the apparatus may be configured to allow the transaction. On the other hand, if the IP address is not in accordance with the one or more limits, the apparatus may be configured to deny the transaction. The limits may also include limits on executing transactions with particular websites, for example through the URL addresses of the websites, merchants that sell products through the URL addresses, or the like.

In some embodiments, limitations may be placed on the individual users 2. Any transaction associated with the user 2 may be monitored or stored as transaction information by the present invention, which may then determine if the transaction is allowed or denied based on the predetermined limitations associated with the user 2. Associating limits on a user level allows for easy replacement of tokens when a token is misappropriated (e.g., when a token is lost) since the limits remain associated with the user 2 regardless of the token used. Limitations associated with the user 2 may also include an association with an account or a device (e.g., a smart phone, a tablet, or the like) known to be owned or operated by the user 2. Limits may further be associated with one user 2, multiple users, a group of users, or all users. The limitations may be statically or dynamically assigned to the user 2. For example, the user 2 may have a spending limit associated with an account on alternating weeks. One week the user 2 may have a spending limit, but the next week the limit may be removed or altered to include a geographic limit. One or more users 2 may be assigned to the same limits, or different limits.

In other embodiments, the limitations may be placed on the tokens. Any transaction associated with the token may be monitored or stored as described by the present invention herein, which may then determine if the transaction is allowed or denied based on the limitations associated with the token. Additionally, by associating the limitations with the token instead of the user 2, the system may more simply replace a first token with one or more limits with a second token with one or more different limits instead of having to log into an account to change the limits associated with account or the user 2 on an as-needed basis. In other embodiments of the invention the token may remain the same and the limits on the token may change. The limitations may be statically or dynamically assigned to the token. Limitations associated with the token may also include an association with an account or a device (e.g., a smart phone, a tablet, or the like) known to have to an account associated with the token.

In another example, two users may both have access to a joint account (e.g., a pre-funded business account) that has a maximum spending limit of $1,000 for a week-long business trip to City 1. The token associated with the joint account, may include limits that authorize transaction requests that are initiated within a 25-mile radius of City 1, or at predetermined travel stops (e.g., airports, bus stops, gas stations, restaurants, hotels, or the like) in route to City 1 for the week of the trip. In some embodiments, the two users may be issued the same token associated with the same account. If one of the two users loses his token (or the security of his token is otherwise misappropriated) then a new replacement token may be issued to one or both of the users. Preexisting limits associated with the token may be required to be reinstated on the newly issued tokens. Alternatively, the preexisting limits may also be automatically transferred to the newly issued replacement token. In other embodiments, the two users may each be issued an individual token associated with the same joint account. If one of the two users loses his token (or the security of his token is otherwise compromised) then a new token may be issued to only one of the users, namely the user who lost his token. Preexisting limits associated with the token may be required to be reinstated on the newly replacement issued token, or may be automatically transferred to the newly issued replacement token.

In continuing with the same example as above, if the limits are placed on the account (e.g., global limits) and the users 2 (e.g., individual user 2 level) then when the tokens are replaced there is no needed to worry about changing the limits on the token or reinstituting the limit because the limits are not associated with the token. However, if there are a large number of users (e.g., 10, 20, 50, 100, 500, 1000, or the like) it may be difficult to continuously monitor the transaction limits of each of the users 2 and change the limits as the needs of each individual user 2 changes. Instead, it may be more efficient to control the limits based on a token level as explained below.

When the limits are associated with a token it may be easier to edit the limits of current tokens by simply pushing (or allowing a user to pull) new tokens into the account whenever the limits change. For example, if the user's 2 configured limits (e.g., a spending limit at entertainment-related merchants) are to be modified for a period of time (e.g., no transactions after 6 pm), the present invention may issue a new token that prevents transactions after 6 pm. In some embodiments, when the token expires the limits on the account are removed. Therefore, the present invention may not be required to constantly update limit configurations, but rather simply issue a new token to the user (or alternatively remove a token from the user). As such, the token may be associated with a specific account, and may further be associated with specific limits. For example, if the user 2 is on a business trip and needs to take a customer on a last minute dinner, the employer (e.g., administrator) may issue the user a new token that can be used for a specific restaurant at a specific time in order to allow a transaction that might not have been previously allowed. In this way the token is provided to the user 2 and it may disappear after the time period is extinguished and/or the transaction is completed. Therefore, the user 2 or multiple users 2 may have real-time access to a larger pool of funds (e.g., a business count) based on access to a token, as well as limits associated with the token or the user 2. If the limits were based on the user 2 the administrator or other entity may have to first modify the limits associated with the user 2 to allow the transaction and thereafter change the limits associated with the user 2 again after the transaction occurs. Thus, the token may serve as a temporary access point to an account. In another example, in a collective group of users 2 instead of allowing all of the users 2 within the collaborative group of users 2 the same access to the account, the administrator or other entity may provide each user 2 multiple tokens (e.g., single use or multi-use tokens) that may be used for specific types of transactions with specific limits. If the limits need to change for the one or more users 2, some of the tokens may be removed and additional tokens may be provided to the users 2 with new limits as opposed to manually configuring the limits associated with each of the users 2. For example, one user in the collaborative group may receive five (5) $20 tokens that can be used specifically at various merchants 10. As the funds are used for each of the tokens the tokens may disappear. Alternatively, another user in the collaborative group of users 10 may receive $100 tokens that can be used to enter into transactions for the hotel rooms of the collaborative group of users 10.

A combination of utilizing limitations on both a global user and/or token scale (e.g., a total spending limit for token associated with a joint account) and an individual user and/or individual token scale (e.g., individual spending limits for each individual user 2 or individual tokens) may provide secure control and regulation of spending with flexibility in limiting transactions in a number of different ways. As an example, limitations can be placed on the user 2 in conjunction with limitations associated with a shared token associated with the joint account. For example, the shared token may have a $1,000 limit, which is further broken down on a user level such that one user may have a spending limit of $700 out of the total $1,000, while the other user may have spending limit of $300 out of the total $1,000. These limitations may help enable the joint account holder (e.g., a corporate account) to effectively manage the overall spending budget while also controlling the spending budgets of each user 2.

The present invention may include means for defining, selecting, modifying, adding, or deleting limitations associated with the user, the token, or the account, as well as for grouping users 2 together. The priority or precedence order of how limitations are applied (e.g., limiting the user 2 before the token, limiting the token before the user, or limiting both the user and the token concurrently) may be configured as well. Limitations may be controlled by a user 2 or by someone else (e.g., a merchant, the issuing financial institution, a representative associated with an entity, a third party, a tokenization service, or the like). The limitations may be effective for a predetermined period of time or independently of time.

While the system has been described as determining whether the transaction meets the limits and either allowing or denying a transaction based on that determination, in some embodiments the limits (also described herein as filters), may also be responsive to transaction information. For example, exceptions to the filters may allow a transaction even if the filter is not met. In an embodiment, the system evaluates the transaction information to determine: (1) does the transaction meet the limits; and (2) if the transaction does not meet the limits, does the transaction qualify for an exception to the limits. If the system determines that a positive response to either query, then transaction may be allowed.

In some embodiments, the exceptions are based at least in part upon the transaction information. For example, the system may determine that a transaction does not meet a category limit because doing so would cause the token to exceed the category limit for the time period. In this example, however, the system also determines that the token is near, e.g., within one week, within three days, within one day, or the like, the expiration date of the token or the current evaluation period for the token and that the token has remaining funds in a different category. Given the short period of time remaining for the expenses to be made, the system may determine that the transaction falls within an exception and allow the transaction. In another example, the system may determine that the user is outside of geographic limits defined by a route. The system, however, determines that the user has conducted a transaction at the merchant frequently in the past and therefore allows the transaction based on the previous number of transactions at the merchant. These examples use multiple types of transaction information, e.g., the date of the transaction, the location of the transaction, the category of the transaction, the amount of the transaction, and the like, to determine if the exceptions apply. In some embodiments, only a single piece of transaction information applies. For example, the system may always permit transactions that are associated with a specific category, for example, emergency expenses. The system may always permit transactions at emergency rooms, doctors' offices, and the like.

In some embodiments, the exceptions are determined by the system and/or the user. For example, the system may provide a list of exceptions based on the user's transaction history. If the user has a favorite coffee shop, the system may allow transactions at the coffee shop up to a certain amount even if the transaction would not meet a limit. The user or an administrator may provide exceptions based on location or other transaction information. For example, the user may input exceptions that allow transactions within a specific region, e.g., a city, that would not be allowed outside of the specific region. The exceptions may be changed at any time by the system or user or administrator.

The exceptions may be limited by frequency, amount, percentage of the limit, or the like. For example, a transaction may qualify for an exception but only up to a certain percentage of the funds remaining in a related category. For example, a transaction may qualify for an exception because the expense period for the token is almost expired and there are remaining funds in a first category. The system may permit a transaction in a second category up to some percentage (e.g., 50%) of the funds remaining in the first category.

The transaction-responsive limits are designed to provide flexibility to the system and better serve the user. The transaction-responsive limits may be tailored to the user or generic to the token and/or system. By providing for transaction-responsive limits, the system allows transactions that would otherwise be denied based on binary yes/no limits when the transaction information indicates the appropriateness of the transaction.

FIG. 5 illustrates a token system 100 environment, in accordance with an embodiment of the present invention. As illustrated in FIG. 5, the user computer systems 160 are operatively coupled, via a network 102 to the merchant systems 110, issuing financial institution systems 140, acquiring financial institution systems 120, payment association networks 130, and/or the tokenization service systems 150. In this way, the user 2 may utilize the user computer systems 160 to enter into secure transactions using a token with the merchant 10 through the use of the merchant systems 110, acquiring financial systems 120, payment association networks 130, the issuing financial institution systems 140, and/or the tokenization service systems 150. FIG. 5 illustrates only one example of embodiments of a token system 100, and it will be appreciated that in other embodiments one or more of the systems (e.g., computers, mobile devices, servers, or other like systems) may be combined into a single system or be made up of multiple systems.

The network 102 may be a global area network (GAN), such as the Internet, a wide area network (WAN), a local area network (LAN), or any other type of network or combination of networks. The network 102 may provide for wireline, wireless, or a combination of wireline and wireless communication between devices on the network.

As illustrated in FIG. 5, the user computer systems 160 generally comprise a communication device 162, a processing device 164, and a memory device 166. As used herein, the term "processing device" generally includes circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 164 is operatively coupled to the communication device 162 and the memory device 166. The processing device 164 uses the communication device 162 to communicate with the network 102 and other devices on the network 102, such as, but not limited to, the merchant systems 110, issuing financial institution systems 140, acquiring financial institution systems 120, payment association network systems 130, and/or tokenization service systems 150. As such, the communication device 162 generally comprises a modem, server, or other device for communicating with other devices on the network 102, and a display, camera, keypad, mouse, keyboard, microphone, and/or speakers for communicating with one or more users 102. The user computer systems 160 may include, for example, a payment device 4, which may be a personal computer, a laptop, a mobile device (e.g., phone, smartphone, tablet, or personal display device ("PDA"), or the like) or other like devices whether or not the devices are mentioned within this specification. In some embodiments the use of the term payment device 4 described herein may be replaced by the term user computer system 160. In some embodiments, the user computer systems 160, such as a payment device 4, or other devices, could include a data capture device that is operatively coupled to the communication device, processing device 164, and the memory device 166. The data capture device could include devices such as, but not limited to a location determining device, such as a radio frequency identification ("RFID") device, a global positioning satellite ("GPS") device, Wi-Fi triangulation device, or the like, which can be used by a user 2, institution, or the like to capture information from a user 2, such as but not limited to the location of the user 2.

As further illustrated in FIG. 5, the user computer systems 160 comprises computer-readable instructions 168 stored in the memory device 166, which in one embodiment includes the computer-readable instructions 168 of a tokenization application 167 (e.g., a digital wallet or other application that utilizes tokens). In some embodiments, the memory device 166 includes a datastore 169 for storing data related to the user computer system 160, including but not limited to data created and/or used by tokenization application 167. As discussed above the tokenization application 167 allows the users 2 to enter into secure transactions using one or more tokens instead of customer account number or other customer information.

As further illustrated in FIG. 5, the merchant systems 110 generally comprise a communication device 112, a processing device 114, and a memory device 116. The processing device 114 is operatively coupled to the communication device 112 and the memory device 116. The processing device 114 uses the communication device 112 to communicate with the network 102, and other devices on the network 102, such as, but not limited to, the user computer systems 160, issuing financial institution systems 140, acquiring financial institution systems 120, payment association network systems 130, and/or the tokenization service systems 150. As such, the communication device 112 generally comprises a modem, server, or other device(s) for communicating with other devices on the network 102.

As illustrated in FIG. 5, the merchant systems 110 comprise computer-readable program instructions 118 stored in the memory device 116, which in one embodiment includes the computer-readable instructions 118 of a transaction application 117. In some embodiments, the memory device 116 includes a datastore 119 for storing data related to the merchant systems 110, including but not limited to data created and/or used by the transaction application 117. The transaction application 117 processes transactions with the user regardless of whether or not the user is using tokens or the actual account number or other account information.

As further illustrated in FIG. 5, the issuing financial institution systems 140 generally comprise a communication device 142, a processing device 144, and a memory device 146. The processing device 144 is operatively coupled to the communication device 142 and the memory device 146. The processing device 144 uses the communication device 142 to communicate with the network 102, and other devices on the network 102, such as, but not limited to, the user computer systems 160, merchant systems 110, acquiring financial institution systems 120, payment association network systems 130, and/or the tokenization service systems 150. As such, the communication device 142 generally comprises a modem, server, or other devices for communicating with other devices on the network 102.

As illustrated in FIG. 5, the issuing financial institution systems 140 comprise computer-readable program instructions 148 stored in the memory device 146, which in one embodiment includes the computer-readable instructions 148 of a user account application 147. In some embodiments, the memory device 146 includes a datastore 149 for storing data related to the issuing financial institution systems 140, including but not limited to data created and/or used by the user account application 147. The user account application 147 allows the issuing financial institution to store information regarding the user accounts. For example, in the embodiments in which the issuing financial institution 40 is responsible for managing the tokenization, the user account application 147 stores the tokens associated with the account number or the other customer information, which the users 2 utilize to enter into transactions. In other embodiments of the invention, the association of the tokens and accounts numbers and other account information from the issuing financial institution 40 may be stored by a third party.

The acquiring financial institution systems 120 are operatively coupled to the user computer systems 160, merchant systems 110, payment association network systems 130, issuing financial institutions 140, or tokenization service systems 150 through the network 102. The acquiring financial institution systems 120 have devices that are the same as or similar to the devices described for the user computer systems 160, merchant systems 110, or the issuing financial institution systems 140 (e.g., communication device, processing device, memory device with computer-readable instructions, datastore, or the like). Thus, the acquiring financial institution systems 120 communicate with the user computer systems 160, merchant systems 110, payment association network systems 130, issuing financial institution systems 140, and/or the tokenization service systems 150, in the same or similar way as previously described with respect to these systems above. The acquiring financial institution systems 120, in some embodiments, receives the tokens and/or other customer information, along with the transactions information for a transaction, from the merchants 10 and distributes this information to the proper tokenization service 50, payment association networks 30, or directly the issuing financial institution 40.

The payment association network systems 130 are operatively coupled to the user computer systems 160, merchant systems 110, acquiring financial institution systems 120, issuing financial institutions 140, or tokenization service systems 150 through the network 102. The payment association network systems 130 have devices that are the same as or similar to the devices described for the user computer systems 160, merchant systems 110, or the issuing financial institution systems 140 (e.g., communication device, processing device, memory device with computer-readable instructions, datastore, or the like). Thus, the payment association network systems 130 communicate with the user computer systems 160, merchant systems 110, acquiring financial institution systems 120, issuing financial institution systems 140, and/or the tokenization service systems 150, in the same or similar way as previously described with respect to these systems above. The payment association networks systems 130, in some embodiments, receive the tokens and/or other customer information, along with the transactions information for a transaction, from the merchants 10 or the acquiring financial institution 20, and distribute this information to the proper issuing financial institution 40.

The tokenization service systems 150 are operatively coupled to the user computer systems 160, merchant systems 110, acquiring financial institution systems 120, or issuing financial institutions 140 through the network 102. The tokenization service systems 150 have devices the same or similar to the devices described for the user computer systems 160, merchant systems 110, or the issuing financial institution systems 140 (e.g., communication device, processing device, memory device with computer-readable instructions, datastore, or the like). Thus, the tokenization service systems 150 communicate with the user computer systems 160, merchant systems 110, acquiring financial institution systems 120, and/or issuing financial institution systems 140, in the same or similar way as previously described with respect to the these systems above. The tokenization service systems 150, in some embodiments, create, associate, and store the tokens, account numbers, and/or other customer information in order to shield the account numbers or other customer account information from the merchants 10, and other parties as described throughout this specification. In some embodiments as illustrated in FIG. 1, the tokenization service systems 150 may be operated by a third party entity. In other embodiments the tokenization service systems 150 may be operated by the issuing financial institution 40 or entity associated with the issuing financial institution 40, such that only the issuing financial institution 40 has access to the actual account number or other account information.

It is understood that the systems and devices described herein illustrate one embodiment of the invention. It is further understood that one or more of the systems, devices, or the like can be combined or separated in other embodiments and still function in the same or similar way as the embodiments described herein.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Pearl, Smalltalk, C++ or the like. However, the computer program code/computer-readable instructions for carrying out operations of the invention may also be written in conventional procedural programming languages, such as the "C" programming language or similar programming languages.

Embodiments of the present invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

To supplement the present disclosure, this application further incorporates entirely by reference the following commonly assigned patent applications:

| Docket Number | U.S. patent application Ser. No. | Title | Filed On |
|---|---|---|---|
| 6070US1. 014033.2138 | | MANAGED DIGITAL WALLETS | Concurrently Herewith |
| 6071US1. 014033.2153 | | TOKEN COLLABORATION NETWORK | Concurrently Herewith |
| 6072US1. 014033.2151 | | LIMITING TOKEN COLLABORATION NETWORK USAGE BY USER | Concurrently Herewith |
| 6072US2. 014033.2152 | | LIMITING TOKEN COLLABORATION NETWORK USAGE BY TOKEN | Concurrently Herewith |
| 6073US1. 014033.2149 | | LIMITING THE USE OF A TOKEN BASED ON A USER LOCATION | Concurrently Herewith |
| 6073US2. 014033.2150 | | AUTHORIZING A TEMPORARY TOKEN FOR A USER | Concurrently Herewith |
| 6074US1. 014033.2148 | | CONTROLLING TOKEN ISSUANCE BASED ON EXPOSURE | Concurrently Herewith |
| 6075US1. 014033.2146 | | FLEXIBLE FUNDING ACCOUNT TOKEN ASSOCIATIONS | Concurrently Herewith |
| 6075US2. 014033.2147 | | ACCOUNT TOKEN ASSOCIATIONS BASED ON SPENDING THRESHOLDS | Concurrently Herewith |
| 6076US1. 014033.2144 | | ONLINE BANKING DIGITAL WALLET MANAGEMENT | Concurrently Herewith |

-continued

| Docket Number | U.S. patent application Ser. No. | Title | Filed On |
|---|---|---|---|
| 6076US2. 014033.2145 | | CUSTOMER TOKEN PREFERENCES INTERFACE | Concurrently Herewith |
| 6076US3. 014033.2172 | | CREDENTIAL PAYMENT OBLIGATION VISIBILITY | Concurrently Herewith |
| 6077US1. 014033.2143 | | PROVIDING SUPPLEMENTAL ACCOUNT INFORMATION IN DIGITAL WALLETS | Concurrently Herewith |
| 6078US1. 014033.2142 | | PROVIDING OFFERS ASSOCIATED WITH PAYMENT CREDENTIALS IN DIGITAL WALLETS | Concurrently Herewith |
| 6078US2. 014033.2179 | | PROVIDING OFFERS ASSOCIATED WITH PAYMENT CREDENTIALS AUTHENTICATED IN A SPECIFIC DIGITAL WALLET | Concurrently Herewith |
| 6079US1. 014033.2141 | | FOREIGN EXCHANGE TOKEN | Concurrently Herewith |
| 6079US2. 014033.2173 | | FOREIGN CROSS-ISSUED TOKEN | Concurrently Herewith |
| 6080US1. 014033.2140 | | DIGITAL WALLET EXPOSURE REDUCTION | Concurrently Herewith |
| 6080US2. 014033.2174 | | MOBILE DEVICE CREDENTIAL EXPOSURE REDUCTION | Concurrently Herewith |
| 6081US1. 014033.2139 | | ATM TOKEN CASH WITHDRAWAL | Concurrently Herewith |
| 014033. 002194 | | RESTORING OR REISSUING OF A TOKEN BASED ON USER AUTHENTICATION | Concurrently Herewith |
| 014033. 002195 | | TOKEN USAGE SCALING BASED ON DETERMINED LEVEL OF EXPOSURE | Concurrently Herewith |

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for use in a token based financial transaction system, whereby a shared token associated with a financial account is utilized by a collaborative group of users, comprising a plurality of users, to enter into transactions, whereby funds for the financial account are provided by the collaborative group of users, the system comprising:
one or more memory devices; and
one or more processing devices operatively coupled to the one or more memory devices, wherein the one or more processing devices are configured to execute computer-readable program code to:
associate the shared token with the financial account, wherein the shared token is a digital token that corresponds to the financial account without including a financial account number of the financial account, wherein the financial account provides a centralized location of the funds for the plurality of users to enter into the transactions using the shared token, and wherein the shared token and the financial account association are stored by a tokenization system or a financial institution system;
associate the shared token with a payment device of each of the plurality of users, wherein the payment device is a mobile phone with a digital wallet, and wherein the shared token is distributed to and stored on the mobile phone within the digital wallet, or token information for accessing the shared token is distributed to and stored on the mobile phone within the digital wallet;
receive a contribution amount from two or more of the plurality of users, wherein the two or more of the plurality of users fund the financial account associated with the shared token with two or more other user financial accounts;
set one or more limits on the use of the shared token by the plurality of users, wherein the one or more limits comprise global limits on the plurality of users and individual limits on at least one of the plurality of users, wherein the one or more limits are associated with the the financial account associated with the shared token, wherein the one or more limits define the transactions that will be authorized when using the shared token, and wherein the one or more limits are stored on the tokenization system or the financial institution system;
receive an indication that the shared token is used in a transaction through the use of the digital wallet on the mobile phone, wherein the indication is received from merchant systems;
receive transaction information associated with the transaction, wherein the transaction information at least includes an identity of a user, wherein the transaction information is received from the merchant systems or the mobile phone;
determine that the shared token and the user are associated with the plurality of users;
identify the global limits placed on the shared token of the user and the individual limits placed on the user based on determining that the shared token is associated with the plurality of users;
determine that the transaction information meets the global limits and the individual limits to allow the transaction when the global limits and the individual limits are met and deny the transaction when the global limits or the individual limits fail to be met;
identify that the shared token has been misappropriated, wherein the shared token is determined misappropriated when the user loses the shared token by losing the mobile phone; and
replace the shared token with a replacement token when the determination is made that the shared token is misappropriated, wherein replacing the shared token comprises removing the shared token from each of the plurality of users by removing the shared token from the digital wallet of the mobile phone of each of the plurality of users and issuing and storing the replacement token on the digital wallet of the mobile phone of each of the plurality of users, wherein the one or more limits on the financial account remain unchanged, wherein the replacement token and the financial account association are stored by the tokenization system or the financial institution system.

2. The system of claim 1, wherein the financial account is a first financial account, and wherein the processing device is further configured to execute computer-readable program code to:
associate the shared token with one or more additional financial accounts in addition to the first financial account, wherein the shared token corresponds to a plurality of financial accounts including the first financial account and the one or more additional financial accounts without including the financial account numbers of the plurality of financial accounts;
after receiving the indication that the shared token is used in the transaction and allowing the transaction, allocate the transaction automatically to a best financial account from the plurality of financial accounts associated with the shared token and complete the transaction.

3. The system of claim 1, wherein the contribution amount from the one or more of the plurality of users is a recurring contribution to continuously fund the financial account.

4. The system of claim 1, wherein the shared token is limited to a time period, such that after the time period is over the shared token associated with the financial account is removed from the payment devices of the plurality of users.

5. The system of claim 1, wherein the one or more limits comprise at least a spending limit on a spending amount for each of the plurality of users based at least in part on the contribution amount contributed by each of the plurality of users.

6. The system of claim 1, wherein the processing device is further configured to execute computer-readable program code to:
remove the replacement token from the payment device associated with at least one of the plurality of users and replace the replacement token with a new token when an administrator dissociates the at least one of the plurality of users from the collaborative group of users.

7. The system of claim 1, wherein the processing device is further configured to execute computer-readable program code to:
add the shared token to a new payment device associated with a new user to add the new user to the plurality of users that may enter into the transactions using the shared token; and
receive a new contribution amount from the new user to fund the financial account.

8. The system of claim 1, wherein the processing device is further configured to execute computer-readable program code to:
assign an administrator to set the one or more limits on the use of the shared token.

9. The system of claim 1, wherein associating the shared token with the payment device of each of the plurality of users comprises associating the shared token with the digital wallet of each of the plurality of users.

10. The system of claim 1, wherein a financial institution stores the association between the shared token, the financial account, and the plurality of users.

11. The system of claim 1, wherein a third party institution stores the association between the shared token, the financial account, and the plurality of users.

12. A computer program product for use in a token based financial transaction system, whereby a shared token associated with a financial account is utilized by a collaborative group of users, comprising a plurality of users, to enter into transactions, whereby funds for the financial account are provided by the collaborative group of users, the computer program product comprising at least one non-transitory computer-readable medium having computer-readable program code portions embodied therein, the computer-readable program code portions comprising:
an executable portion configured for associating the shared token with the financial account, wherein the shared token is a digital token that corresponds to the financial account without including a financial account number of the financial account, wherein the financial account provides a centralized location of the funds for the plurality of users to enter into the transactions using the shared token, and wherein the shared token and the financial account association are stored by a tokenization system or a financial institution system;
an executable portion configured for associating the shared token with a payment device of each of the plurality of users, wherein the payment device is a mobile phone with a digital wallet, and wherein the shared token is distributed to and stored on the mobile phone within the digital wallet, or token information for accessing the shared token is distributed to and stored on the mobile phone within the digital wallet;
an executable portion configured for receiving a contribution amount from two or more of the plurality of users, wherein the two or more of the plurality of users fund the financial account associated with the shared token with two or more other user financial accounts;
an executable portion configured for setting one or more limits on the use of the shared token by the plurality of users, wherein the one or more limits comprise global limits on the plurality of users and individual limits on at least one of the plurality of users, wherein the one or more limits are associated with the financial account associated with the shared token, wherein the one or more limits define the transactions that will be authorized when using the shared token, and wherein the one or more limits are stored on the tokenization system or the financial institution system
an executable portion configured for receiving an indication that the shared token is used in a transaction through the use of the digital wallet on the mobile phone, wherein the indication is received from merchant systems;
an executable portion configured for receiving transaction information associated with the transaction, wherein the transaction information at least includes an identity of a user, and wherein the transaction information is received from the merchant systems or the mobile phone;
an executable portion configured for determining that the shared token and the user are associated with the plurality of users;
an executable portion configured for identifying the global limits placed on the shared token of the user and the individual limits placed on the user based on determining that the shared token is associated with the plurality of users;

an executable portion configured for determining that the transaction information meets the global limits and the individual limits to allow the transaction when the global limits and the individual limits are met and deny the transaction when the global limits or the individual limits fail to be met;

an executable portion configured for identifying that the shared token has been misappropriated, wherein the shared token is determined misappropriated when the user loses the shared token by losing the mobile phone; and an executable portion configured for replacing the shared token with a replacement token when the determination is made that the shared token is misappropriated, wherein replacing the shared token comprises removing the shared token from each of the plurality of users by removing the shared token from the digital wallet of the mobile phone of each of the plurality of users and issuing and storing the replacement token on the digital wallet of the mobile phone of each of the plurality of users, wherein the one or more limits on the financial account remain unchanged, wherein the replacement token and the financial account association are stored by the tokenization system or the financial institution system.

13. The computer program product of claim 12, wherein the financial account is a first financial account, and wherein the computer-readable program code portions further comprise:

an executable portion configured for associating the shared token with one or more additional financial accounts in addition to the first financial account, wherein the shared token corresponds to a plurality of financial accounts including the first financial account and the one or more additional financial accounts without including the financial account numbers of the plurality of financial accounts;

an executable portion configured for allowing the transaction after receiving the indication that the shared token is used in the transaction, and allocating the transaction automatically to a best financial account from the plurality of financial accounts associated with the shared token and complete the transaction.

14. The computer program product of claim 12, wherein the contribution amount from the one or more of the plurality of users is a recurring contribution to continuously fund the financial account.

15. The computer program product of claim 12, wherein the shared token is limited to a time period, such that after the time period is over the shared token associated with the financial account is removed from the payment devices of the plurality of users.

16. The computer program product of claim 12, wherein the one or more limits comprise at least a spending limit on a spending amount for each of the plurality of users based at least in part on the contribution amount contributed by the one or more of the plurality of users.

17. The computer program product of claim 12, wherein the computer-readable program code portions further comprise:

an executable portion configured for removing the replacement token from the payment device associated with at least one of the plurality of users and replace the replacement token with a new token when an administrator dissociates the at least one of the plurality of users from the collaborative group of users.

18. The computer program product of claim 12, wherein the computer-readable program code portions further comprise:

an executable portion configured for adding the shared token to a new payment device associated with a new user to add the new user to the plurality of users that may enter into the transactions using the shared token; and an executable portion configured for receiving a new contribution amount from the new user to fund the financial account.

19. The computer program product of claim 12, wherein the computer-readable program code portions further comprise:

an executable portion configured for assigning an administrator to set the one or more limits on the use of the shared token.

20. A method for using a token based financial transaction system, whereby a shared token associated with a financial account is utilized by a collaborative group of users, comprising a plurality of users, to enter into transactions, whereby funds for the financial account are provided by the collaborative group of users, the method comprising:

associating, by one or more processing devices, the shared token with the financial account, wherein the shared token is a digital token that corresponds to the financial account without including a financial account number of the financial account, wherein the financial account provides a centralized location of the funds for the plurality of users to enter into the transactions using the shared token, and wherein the shared token and the financial account association are stored by a tokenization system or a financial institution system;

associating, by the one or more processing devices, the shared token with a payment device of each of the plurality of users, wherein the payment device is a mobile phone with a digital wallet, and wherein the shared token is distributed to and stored on the mobile phone within the digital wallet, or token information for accessing the shared token is distributed to and stored on the mobile phone within the digital wallet;

receiving, by the one or more processing devices, a contribution amount from two or more of the plurality of users, wherein the two or more of the plurality of users fund the financial account associated with the shared token with two or more other user financial accounts; and setting, by the one or more processing devices, one or more limits on the use of the shared token by the plurality of users, wherein the one or more limits comprise global limits on the plurality of users and individual limits on at least one of the plurality of users, wherein the one or more limits are associated with the financial account associated with the shared token, wherein the one or more limits define the transactions that will be authorized when using the shared token, and wherein the one or more limits are stored on the tokenization system or the financial institution system receiving, by the one or more processing devices, an indication that the shared token is used in a transaction through the use of the digital wallet on the mobile phone, wherein the indication is received from merchant systems;

receiving, by the one or more processing devices, transaction information associated with the transaction, wherein the transaction information at least includes an identity of a user, and wherein the transaction information is received from the merchant systems or the mobile phone;

determining, by the one or more processing devices, that the shared token and the user are associated with the plurality of users;

identifying, by the one or more processing devices, the global limits placed on the shared token of the user and the individual limits placed on the user based on determining that the shared token is associated with the plurality of users;

determining, by the one or more processing devices, that the transaction information meets the global limits and the individual limits to allow the transaction when the global limits and the individual limits are met and deny the transaction when the global limits or the individual limits fail to be met;

identifying, by the one or more processing devices, that the shared token has been misappropriated, wherein the shared token is determined misappropriated when the user loses the shared token by losing the mobile phone; and replacing, by the one or more processing devices, the shared token with a replacement token when the determination is made that the shared token is misappropriated, wherein replacing the shared token comprises removing the shared token from each of the plurality of users by removing the shared token from the digital wallet of the mobile phone of each of the plurality of users and issuing and storing the replacement token on the digital wallet of the mobile phone of each of the plurality of users, wherein the one or more limits on the financial account remain unchanged, wherein the replacement token and the financial account association are stored by the tokenization system or the financial institution system.

* * * * *